United States Patent
Cheng et al.

(10) Patent No.: US 9,913,227 B2
(45) Date of Patent: Mar. 6, 2018

(54) POWER DETERMINING METHOD, USER EQUIPMENT, AND BASE STATION

(71) Applicant: Huawei Technologies Co., Ltd., Shenzhen (CN)

(72) Inventors: Yan Cheng, Beijing (CN); Zhiyu Yan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/402,001

(22) Filed: Jan. 9, 2017

(65) Prior Publication Data

US 2017/0118726 A1    Apr. 27, 2017

Related U.S. Application Data

(63) Continuation of application No. 14/671,857, filed on Mar. 27, 2015, now Pat. No. 9,565,643, which is a (Continued)

(30) Foreign Application Priority Data

Sep. 29, 2012   (WO) ............... PCT/CN2012/082489

(51) Int. Cl.
*H04W 52/32* (2009.01)
*H04W 72/12* (2009.01)
(Continued)

(52) U.S. Cl.
CPC ......... *H04W 52/325* (2013.01); *H04L 1/1887* (2013.01); *H04L 5/0048* (2013.01);
(Continued)

(58) Field of Classification Search
CPC . H04W 52/146; H04W 52/367; H04W 52/14; H04W 52/30
See application file for complete search history.

(56) References Cited

U.S. PATENT DOCUMENTS 8,483,742 B2   7/2013 Kim et al.
2012/0076023 A1   3/2012 Ko et al.
(Continued)

FOREIGN PATENT DOCUMENTS

CN   101868000 A   10/2010
CN   102300305 A   12/2011
(Continued)

OTHER PUBLICATIONS

U.S. Appl. No. 14/671,857, filed Mar. 27, 2015.
(Continued)

*Primary Examiner* — Khaled Kassim
*Assistant Examiner* — Syed S Ali
(74) *Attorney, Agent, or Firm* — Leydig, Voit & Mayer, Ltd.

(57) ABSTRACT

Embodiments of the present invention provide a power determining method, a user equipment, and a base station. The method includes: determining an initial transmit power of each transmission object in a transmission object set; when a sum of initial transmit powers of all the transmission objects in the transmission object set is greater than a maximum transmit power, performing a power reduction operation based on a priority sequence of information corresponding to the transmission objects, so as to acquire an available transmit power of each transmission object in the transmission object set, where a sum of available transmit powers of all the transmission objects in the transmission object set is not greater than the maximum transmit power; and sending each transmission object in the transmission object set according to the available transmit power corresponding to each transmission object in the transmission object set.

22 Claims, 8 Drawing Sheets

Related U.S. Application Data continuation of application No. PCT/CN2013/084072, filed on Sep. 24, 2013.

(51) Int. Cl.
  *H04W 52/14* (2009.01)
  *H04L 5/00* (2006.01)
  *H04W 72/04* (2009.01)
  *H04L 1/18* (2006.01)

(52) U.S. Cl.
  CPC ..... *H04W 52/146* (2013.01); *H04W 72/0413* (2013.01); *H04W 72/1242* (2013.01)

(56) References Cited

U.S. PATENT DOCUMENTS

| | | |
|---|---|---|
| 2012/0134306 A1 | 5/2012 | Cheng et al. |
| 2012/0213172 A1* | 8/2012 | Kim .............. H04W 52/146 370/329 |
| 2012/0243511 A1 | 9/2012 | Lv et al. |
| 2012/0314613 A1 | 12/2012 | Zhang et al. |
| 2013/0022007 A1 | 1/2013 | Berggren et al. |
| 2013/0028192 A1 | 1/2013 | Cheng et al. |
| 2013/0051259 A1 | 2/2013 | Kim et al. |
| 2013/0051297 A1 | 2/2013 | Kim et al. |
| 2013/0100911 A1 | 4/2013 | Lv et al. |
| 2013/0242911 A1 | 9/2013 | Heo et al. |
| 2013/0279433 A1* | 10/2013 | Dinan .............. H04W 56/0005 370/329 |
| 2014/0023028 A1 | 1/2014 | Zhang et al. |
| 2014/0050205 A1 | 2/2014 | Ahn et al. |
| 2014/0079002 A1 | 3/2014 | Chen et al. |
| 2016/0044611 A1* | 2/2016 | Dai .............. H04W 52/146 370/329 |
| 2016/0205685 A1 | 7/2016 | Wang et al. |
| 2017/0013565 A1* | 1/2017 | Pelletier .............. H04W 52/146 |

FOREIGN PATENT DOCUMENTS

| | | |
|---|---|---|
| CN | 102340850 A | 2/2012 |
| CN | 102355339 A | 2/2012 |
| CN | 102378341 A | 3/2012 |
| CN | 102474830 A | 5/2012 |
| WO | WO 2010091425 A2 | 8/2010 |
| WO | WO 2011139120 A2 | 11/2011 |

OTHER PUBLICATIONS

"Simultaneous transmissions in multiple TA groups," 3GPP TSG RAN WG1 #68, Dresden, Germany, R1-110424, 3rd Generation Partnership Project, Valbonne, France (Feb. 6-10, 2012).

"Multiple Timing Advances for Carrier Aggregation," 3GPP TSG RAN WG1 Meeting #66bis, Zhuhai, China, R1-113314, 3rd Generation Partnership Project, Valbonne, France (Oct. 10-14, 2011).

Notice of Allowance in corresponding U.S. Appl. No. 14/671,857 (Sep. 23, 2016).

"$3^{rd}$ Generation Partnership Project; Technical Specification Group Radio Access Network; Evolved Universal Terrestrial Radio Access (E-UTRA); Radio Resource Control (RRC); Protocol specification (Release 11)," 3GPP TS 36.331, V11.1.0, pp. 1-325, $3^{rd}$ Generation Partnership Project, Valbonne, France (Sep. 2012).

"$3^{rd}$ Generation Partnership Project; Technical Specification Group Radio Access Network; Evolved Universal Terrestrial Radio Access (E-UTRA); Physical layer procedures (Release 11)," 3GPP TS 36.213, V11.0.0, pp. 1-143, $3^{rd}$ Generation Partnership Project, Valbonne, France (Sep. 2012).

* cited by examiner

200

---

Determine a first transmission object set, where the first transmission object set includes all to-be-transmitted uplink channels and/or SRSs of a user equipment — S210

When it is determined that a sum of transmit powers of all transmission objects in the first transmission object set is greater than a maximum transmit power of the user equipment, perform a power reduction operation based on a priority sequence of information corresponding to the transmission objects, so as to acquire an available transmit power of each transmission object in the first transmission object set, where a sum of available transmit powers of all the transmission objects in the first transmission object set is less than or equal to the maximum transmit power of the user equipment — S220

Determine, from the first transmission object set and according to the available transmit power of each transmission object in the first transmission object set, a second transmission object set that needs to be scheduled, where an available transmit power of each transmission object in the second transmission object set is not 0 — S230

Determine, according to the available transmit power of each transmission object in the first transmission object set, a second transmission object set that needs to be scheduled, where an available transmit power of each transmission object in the second transmission object set is not 0 — S240

FIG. 2

POWER DETERMINING METHOD, USER EQUIPMENT, AND BASE STATION

CROSS-REFERENCE TO RELATED APPLICATIONS

This application is a continuation of U.S. patent application Ser. No. 14/671,857, filed on Mar. 27, 2015, which claims priority to International Application No. PCT/CN2013/084072, filed on Sep. 24, 2013, which claims priority to International Patent Application No. PCT/CN2012/082489, filed on Sep. 29, 2012. All of the aforementioned patent applications are hereby incorporated by reference in their entireties.

TECHNICAL FIELD

The present invention relates to the communications field, and more specifically, to a power determining method, a user equipment, and a base station.

BACKGROUND

A Long Term Evolution-Advanced ("LTE-A" for short) system is an evolution and enhancement to a 3rd Generation Partnership Project ("3GPP" for short) Long Term Evolution ("LTE" for short) system. A carrier aggregation ("CA" for short) technology, also known as a spectrum aggregation technology or a bandwidth extension technology, is introduced in the LTE-A system, to ensure that a peak data rate provided by a fourth generation communications technology can satisfy requirements of the International Telecommunication Union. In carrier aggregation, spectrums of two or more component carriers are aggregated to achieve wider transmission bandwidth, where the spectrums of the component carriers may be contiguous continuous spectrums, or may be non-contiguous spectrums within a same frequency band or even discontinuous spectrums in different frequency bands. An LTE Rel-8/9 user equipment ("UE" for short) can access only one of the component carriers to receive and send data; whereas, an LTE-A user equipment can simultaneously access multiple component carriers according to its capability and service requirement to receive and send data.

To support technologies such as dynamic scheduling, downlink multiple input multiple output ("MIMO" for short) transmission, and hybrid automatic repeat request, a terminal needs to feed back multiple types of uplink control information ("UCI" for short), including channel state information ("CSI" for short), hybrid automatic repeat request ("HARQ" for short) information, a scheduling request ("SR" for short), and the like, to a base station through a physical uplink control channel ("PUCCH" for short) and a physical uplink shared channel ("PUSCH" for short), where the hybrid automatic repeat request information may be simply called acknowledgment ("ACK" for short)/negative acknowledgment ("NACK" for short), or the hybrid automatic repeat request information may be called hybrid automatic repeat request acknowledgment HARQ-ACK.

However, in a CA system between base stations, because data scheduling of multiple downlink carriers is independently performed by each base station, which means that uplink control information ("UCI" for short) of each carrier is separately fed back to a base station of each carrier. In which case, a UE may have to transmit UCI on multiple carriers, for example, multiple PUCCHs are simultaneously transmitted or multiple PUSCHs carrying UCI are transmitted. Total transmit power of all to-be-transmitted uplink channels and/or sounding reference signals ("SRS" for short) exceeds maximum transmit power of the user equipment, and consequently, the user equipment cannot send information properly.

SUMMARY

Embodiments of the present invention provide a power determining method, a user equipment, and a base station, which can solve the problem in which a sum of transmit powers of transmission objects of a user equipment is greater than a maximum transmit power of the user equipment.

According to a first aspect, a power determining method is provided and includes:

determining an initial transmit power of each transmission object in a transmission object set, where the transmission object set includes all to-be-transmitted uplink channels and/or sounding reference signals SRSs;

when a sum of initial transmit powers of all the transmission object in the transmission object set is greater than a maximum transmit power, performing a power reduction operation based on a priority sequence of information corresponding to a transmission object, so as to acquire an available transmit power of each transmission object in the transmission object set, wherein a sum of the available transmit powers of all the transmission objects in the transmission object set is not greater than the maximum transmit power; and sending each transmission object in the transmission object set according to the available transmit power corresponding to each transmission object in the transmission object set.

With reference to the first aspect, in a first possible implementation of the first aspect, the priority sequence of the information corresponding to a transmission object includes at least one of the following:

a priority sequence of a type of a transmission object, a priority sequence of UCI carried in a transmission object, and a priority sequence of a carrier corresponding to a transmission object.

With reference to the first possible implementation of the first aspect, in a second possible implementation of the first aspect, the priority sequence of a type of a transmission object includes at least one of the following:

when a physical random access channel PRACH exists, the PRACH has a highest priority;

when a physical uplink control channel PUCCH and a physical uplink shared channel PUSCH coexist, a priority of the PUCCH is higher than a priority of the PUSCH, or a priority of the PUCCH is higher than a priority of a PUSCH not carrying UCI and is the same as a priority of a PUSCH carrying UCI;

when a PUSCH carrying uplink control information UCI and a PUSCH not carrying UCI coexist, a priority of the PUSCH carrying UCI is higher than a priority of the PUSCH not carrying UCI; and when a PRACH, a PUCCH, a PUSCH, and an SRS coexist, the SRS has a lowest priority.

With reference to the first possible implementation of the first aspect or the second possible implementation of the first aspect, in a third possible implementation of the first aspect, the priority sequence of UCI carried in a transmission object includes at least one of the following:

when channel state information and a scheduling request exist, a priority of the channel state information is lower than a priority of the scheduling request; and when hybrid automatic repeat request information and a scheduling request exist, a priority of the hybrid automatic repeat request information is higher than or equal to a priority of the scheduling request.

With reference to the third possible implementation of the first aspect, in a fourth possible implementation of the first aspect, the priority sequence of UCI carried in a transmission object includes at least one of the following:

when channel state information exists and the channel state information includes a channel quality indicator and a precoding matrix, a priority of the channel quality indicator is equal to a priority of the precoding matrix; and when channel state information exists and the channel state information includes a rank indicator, a channel quality indicator, and a precoding matrix, the rank indicator has a highest priority.

With reference to any one of the first to the fourth possible implementations of the first aspect, in a fifth possible implementation of the first aspect, the priority sequence of the carriers corresponding to a transmission object includes at least one of the following:

a priority sequence determined based on a index sequence number of the carrier, a carrier priority sequence configured by an upper layer, a priority sequence determined based on a duplex mode of the carrier, a priority sequence determined based on a radio resource control RRC connection state of a carrier, and a priority sequence determined based on a transmission point corresponding to a carrier.

With reference to the fifth possible implementation of the first aspect, in a sixth possible implementation of the first aspect, the priority sequence determined based on the RRC connection state of the carrier includes at least one of the following:

a priority of a carrier supporting RRC connection is higher than a priority of a carrier not supporting RRC connection; and a priority of a carrier carrying RRC information is higher than a priority of a carrier not carrying RRC information.

With reference to the fifth or the sixth possible implementation of the first aspect, in a seventh possible implementation of the first aspect, the priority sequence determined based on the duplex mode of the carrier includes that: a priority of a carrier whose duplex mode is frequency division duplex FDD is lower than a priority of a carrier whose duplex mode is time division TDD.

With reference to the first aspect, in an eighth possible implementation of the first aspect, the priority sequence of the information corresponding to a transmission object includes at least one of the following:

a priority of a PUCCH transmitted on a carrier whose duplex mode is FDD is lower than a priority of a PUCCH transmitted on a carrier whose duplex mode is TDD, and both the PUCCH transmitted on the FDD carrier and the PUCCH transmitted on the TDD carrier carry hybrid automatic repeat request information; and a priority of a PUCCH transmitted on a carrier whose duplex mode is FDD is lower than a priority of a PUSCH that carries UCI and is transmitted on a carrier whose duplex mode is TDD, where the UCI in the UCI-carrying PUSCH transmitted on the TDD carrier includes hybrid automatic repeat request information.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, or the seventh possible implementation of the first aspect, in a ninth possible implementation of the first aspect, the performing a power reduction operation based on a priority sequence of information corresponding to a transmission object includes:

determining a priority of each transmission object in the transmission object set according to the priority sequence of the information corresponding to a transmission object and corresponding information of each transmission object in the transmission object set; and performing the power reduction operation according to the priority of each transmission object in the transmission object set.

With reference to the ninth possible implementation of the first aspect, in a tenth possible implementation of the first aspect, the determining a priority of each transmission object in the transmission object set according to the priority sequence of the information corresponding to the transmission object and corresponding information of each transmission object in the transmission object set includes:

determining some of the transmission objects have a same priority after according to a priority sequence of a type of a transmission object and a type of each transmission object in the transmission object set, wherein the priority sequence of a type of a transmission object is comprised in the priority sequence of the information corresponding to the transmission objects; and when some of the transmission objects have a same priority after the priority of the each transmission object in the transmission object set is determined according to a priority sequence of a type of a transmission object and a type of the each transmission object in the transmission object set, determining a priority of each transmission object in same-priority transmission objects according to a priority sequence of UCI carried in a transmission object and UCI of each transmission object in the same-priority transmission objects, wherein the priority sequence of the UCI carried in the transmission object is comprised in the priority sequence of the information corresponding to the transmission objects, or determining a priority of each transmission object in same-priority transmission objects according to a priority sequence of a carrier corresponding to a transmission object and a carrier corresponding to each transmission object in the same-priority transmission objects, wherein the priority sequence of the carrier corresponding to the transmission object is comprised in the priority sequence of the information corresponding to the transmission objects.

With reference to the ninth possible implementation of the first aspect or the tenth possible implementation of the first aspect, in an eleventh possible implementation of the first aspect, the performing the power reduction operation according to the priority of each transmission object in the transmission object set includes:

performing the power reduction operation for the transmission objects in the transmission object set one by one according to the priorities of the transmission objects, with a transmission object of a lowest priority being the first to undergo the power reduction, until a sum of acquired available transmit powers of all the transmission objects in the transmission object set is less than or equal to the maximum transmit power.

With reference to the eleventh possible implementation of the first aspect, in a twelfth possible implementation of the first aspect, when performing the power reduction for the transmission objects in the transmission object set one by one according to the priorities of the transmission objects, with a transmission object of a lowest priority being the first to undergo the power reduction, it is satisfied that if an available transmit power for a priority of n is not 0, an available transmit power of a transmission object with a priority of n+1 is equal to an initial transmit power of the transmission object with the priority of n+1, where m is the number of transmission objects in the transmission object set, m≥n≥1, and a transmission object with a priority of 1 has a lowest priority.

With reference to the ninth possible implementation of the first aspect, the tenth possible implementation of the first aspect, the eleventh possible implementation of the first aspect, or the twelfth possible implementation of the first aspect, in a thirteenth possible implementation of the first aspect, the performing the power reduction operation according to the priority of each transmission object in the transmission object set includes:

when multiple transmission objects have a same priority, performing equal power reduction for the multiple transmission objects that have the same priority.

According to a second aspect, a power determining method is provided and includes:

determining a first transmission object set, where the first transmission object set includes all to-be-transmitted uplink channels and/or sounding reference signals SRSs of a user equipment when it is determined that a sum of transmit powers of all transmission objects in the first transmission object set is greater than a maximum transmit power of the user equipment, performing a power reduction operation based on a priority sequence of information corresponding to the transmission objects, so as to acquire an available transmit power of each transmission object in the first transmission object set, where a sum of available transmit powers of all the transmission objects in the first transmission object set is less than or equal to the maximum transmit power of the user equipment;

determining, from the first transmission object set and according to the available transmit power of each transmission object in the first transmission object set, a second transmission object set that needs to be scheduled, where an available transmit power of a transmission object in the second transmission object set is not 0; and performing scheduling for the user equipment according to the second transmission object set.

With reference to the second aspect, in a first possible implementation of the second aspect, the priority sequence of the information corresponding to a transmission object includes at least one of the following:

a priority sequence of a type of a transmission object, a priority sequence of uplink control information UCI carried in a transmission object, and a priority sequence of a carrier corresponding to a transmission object.

With reference to the second aspect or the first possible implementation of the second aspect, in a second possible implementation of the second aspect, the performing a power reduction operation based on a priority sequence of information corresponding to the transmission objects includes:

determining a priority of each transmission object in the first transmission object set according to the priority sequence of the information corresponding to a transmission object and corresponding information of each transmission object in the first transmission object set; and performing the power reduction operation according to the priority of each transmission object in the first transmission object set.

With reference to the second possible implementation of the second aspect, in a third possible implementation of the second aspect, the performing the power reduction operation according to the priority of each transmission object in the first transmission object set includes:

performing the power reduction operation for the transmission objects in the first transmission object set one by one according to the priorities of the transmission objects, with a transmission object of a lowest priority being the first to undergo the power reduction, until a sum of acquired available transmit powers of all the transmission objects in the first transmission object set is less than or equal to the maximum transmit power.

With reference to the third possible implementation of the second aspect, in a fourth possible implementation of the second aspect, when performing the power reduction for the transmission objects in the first transmission object set one by one according to the priorities of the transmission objects, with a transmission object of a lowest priority being the first to undergo the power reduction, it is satisfied that if an available transmit power for a priority of n is not 0, an available transmit power of a transmission object with a priority of n+1 is equal to an initial transmit power of the transmission object with the priority of n+1, where m is the number of transmission objects in the first transmission object set, m≥n≥1, and a transmission object with a priority of 1 has a lowest priority.

With reference to the second possible implementation of the second aspect, the third possible implementation of the second aspect, or the fourth possible implementation of the second aspect, in a fifth possible implementation of the second aspect, the performing the power reduction operation according to the priority of each transmission object in the transmission object set includes:

when multiple transmission objects have a same priority, performing equal power reduction for the multiple transmission objects that have the same priority.

According to a third aspect, a user equipment is provided and includes:

an acquiring unit, configured to acquire an initial transmit power of each transmission object in a transmission object set, wherein the transmission object set comprises all to-be-transmitted uplink channels and/or sounding reference signals SRSs, and configured to acquire a maximum transmit power and acquire a priority sequence of information corresponding to a transmission object;

a power reducing unit, configured to: when a sum of initial transmit powers acquired by the acquiring unit for all the transmission objects in the transmission object set is greater than the maximum transmit power, perform a power reduction operation based on the priority sequence acquired by the acquiring unit for the information corresponding to a transmission object, so as to acquire an available transmit power of each transmission object in the transmission object set, wherein a sum of available transmit powers of all the transmission objects in the transmission object set is not greater than the maximum transmit power; and a sending unit, configured to send each transmission object in the transmission object set according to the available transmit power that is acquired by the power reducing unit and is corresponding to each transmission object in the transmission object set.

With reference to the third aspect, in a first possible implementation of the third aspect, the acquiring unit is specifically configured to:

acquire the priority sequence of the information corresponding to the transmission object, wherein the priority sequence of the information corresponding to the transmission object comprises at least one of the following: a priority sequence of a type of the transmission object, a priority sequence of UCI carried in the transmission object, and a priority sequence of a carrier corresponding to a transmission object.

With reference to the first possible implementation of the third aspect, in a second possible implementation of the third aspect, the acquiring unit is specifically configured to acquire the priority sequence of a type of a transmission object, wherein the priority sequence of the type of the transmission object includes at least one of the following:

when a physical random access channel PRACH exists, the PRACH has a highest priority;

when a physical uplink control channel PUCCH and a physical uplink shared channel PUSCH coexist, a priority of the PUCCH is higher than a priority of the PUSCH, or a priority of the PUCCH is higher than a priority of a PUSCH not carrying UCI and is the same as a priority of a PUSCH carrying UCI;

when a PUSCH carrying uplink control information UCI and a PUSCH not carrying UCI coexist, a priority of the PUSCH carrying UCI is higher than a priority of the PUSCH not carrying UCI; and when a PRACH, a PUCCH, a PUSCH, and an SRS coexist, the SRS has a lowest priority.

With reference to the first possible implementation of the third aspect or the second possible implementation of the third aspect, in a third possible implementation of the third aspect, the acquiring unit is specifically configured to acquire the priority sequence of the UCI carried in the transmission object, wherein the priority sequence of the UCI carried in the transmission object includes at least one of the following:

when channel state information and a scheduling request exist, a priority of the channel state information is lower than a priority of the scheduling request; and when hybrid automatic repeat request information and a scheduling request exist, a priority of the hybrid automatic repeat request information is higher than or equal to a priority of the scheduling request.

With reference to the third possible implementation of the third aspect, in a fourth possible implementation of the third aspect, the acquiring unit is specifically configured to acquire the priority sequence of the UCI carried in the transmission object, wherein the priority sequence of the UCI carried in the transmission object includes at least one of the following:

when channel state information exists and the channel state information includes a channel quality indicator and a precoding matrix, a priority of the channel quality indicator is equal to a priority of the precoding matrix; and when channel state information exists and the channel state information includes a rank indicator, a channel quality indicator, and a precoding matrix, the rank indicator has a highest priority.

With reference to any one of the first to the fourth possible implementations of the third aspect, in a fifth possible implementation of the third aspect, the acquiring unit is specifically configured to acquire the priority sequence of the carrier corresponding to the transmission object, wherein the priority sequence of the carrier corresponding to the transmission object includes at least one of the following:

a priority sequence determined based on a index sequence number of the carrier, a carrier priority sequence configured by an upper layer, a priority sequence determined based on a duplex mode of the carrier, a priority sequence determined based on a radio resource control RRC connection state of a carrier, and a priority sequence determined based on a transmission point corresponding to a carrier.

With reference to the fifth possible implementation of the third aspect, in a sixth possible implementation of the third aspect, the acquiring unit is specifically configured to acquire the priority sequence determined based on the RRC connection state of the carrier, wherein the priority sequence determined based on the RRC connection state of the carrier includes at least one of the following:

a priority of a carrier supporting RRC connection is higher than a priority of a carrier not supporting RRC connection; and a priority of a carrier carrying RRC information is higher than a priority of a carrier not carrying RRC information.

With reference to the fifth or the sixth possible implementation of the third aspect, in a seventh possible implementation of the third aspect, the acquiring unit is specifically configured to acquire the priority sequence determined based on the duplex modes of the carriers, where the priority sequence determined based on the duplex modes of the carriers includes that:

a priority of a carrier whose duplex mode is frequency division duplex FDD is lower than a priority of a carrier whose duplex mode is time division TDD.

With reference to the third aspect, in an eighth possible implementation of the third aspect, the acquiring unit is specifically configured to acquire the priority sequence of the information corresponding to the transmission object, wherein the priority sequence of the information corresponding to the transmission object includes at least one of the following:

a priority of a PUCCH transmitted on a carrier whose duplex mode is FDD is lower than a priority of a PUCCH transmitted on a carrier whose duplex mode is TDD, and both the PUCCH transmitted on the carrier whose duplex mode is FDD and the PUCCH transmitted on the carrier carry hybrid automatic repeat request information; and a priority of a PUCCH transmitted on a carrier whose duplex mode is FDD is lower than a priority of a PUSCH that carries UCI and is transmitted on a carrier whose duplex mode is TDD, where the UCI in the UCI-carrying PUSCH transmitted on the TDD carrier includes hybrid automatic repeat request information.

With reference to the third aspect, the first possible implementation of the third aspect, the second possible implementation of the third aspect, the third possible implementation of the third aspect, the fourth possible implementation of the third aspect, the fifth possible implementation of the third aspect, the sixth possible implementation of the third aspect, or the seventh possible implementation of the third aspect, in a ninth possible implementation of the third aspect, the power reducing unit includes:

a determining subunit, configured to determine a priority of each transmission object in the transmission object set according to the priority sequence of the information corresponding to the transmission object and corresponding information of each transmission object in the transmission object set; and a power reducing subunit, configured to perform the power reduction operation according to the priority determined by the determining subunit for each transmission object in the transmission object set.

With reference to the ninth possible implementation of the third aspect, in a tenth possible implementation of the third aspect, the determining subunit is specifically configured to:

determine the priority of each transmission object in the transmission object set according to the priority sequence of the type of the transmission object and a type of each transmission object in the transmission object set, wherein the priority sequence of the type of the transmission object is comprised in the priority sequence of the information corresponding to the transmission objects; and when some of the transmission objects have a same priority after the priority of the each transmission object in the transmission object set is determined according to a priority sequence of a type of a transmission object and a type of the each transmission object in the transmission object set, determine a priority of each transmission object in same-priority transmission objects according to a priority sequence of UCI carried in a transmission object and UCI of each transmission object in the same-priority transmission objects, wherein the priority sequence of the UCI carried in the transmission object is comprised in the priority sequence of the information corresponding to the transmission objects, or determine a priority of each transmission object in same-priority transmission objects according to a priority sequence of a carrier corresponding to a transmission object and a carrier corresponding to each transmission object in the same-priority transmission objects, wherein the priority sequence of the carrier corresponding to the transmission object is comprised in the priority sequence of the information corresponding to the transmission objects.

With reference to the ninth possible implementation of the third aspect or the tenth possible implementation of the third aspect, in an eleventh possible implementation of the third aspect, the power reducing subunit is specifically configured to:

perform the power reduction operation for the transmission objects in the transmission object set one by one according to the priorities of the transmission objects, with a transmission object of a lowest priority being the first to undergo the power reduction, until a sum of acquired available transmit powers of all the transmission objects in the transmission object set is less than or equal to the maximum transmit power.

With reference to the eleventh possible implementation of the third aspect, in a twelfth possible implementation of the third aspect, the power reducing subunit is specifically configured to:

perform the power reduction operation for the transmission objects in the transmission object set one by one according to the priorities of the transmission objects, with a transmission object of a lowest priority being the first to undergo the power reduction, until the sum of the acquired available transmit powers of all the transmission objects in the transmission object set is less than or equal to the maximum transmit power, where when performing the power reduction for the transmission objects in the transmission object set one by one according to the priorities of the transmission objects, with a transmission object of a lowest priority being the first to undergo the power reduction, it is satisfied that if an available transmit power for a priority of n is not 0, an available transmit power of a transmission object with a priority of n+1 is equal to an initial transmit power of the transmission object with the priority of n+1, where m is the number of transmission objects in the transmission object set, $m \geq n \geq 1$, and a transmission object with a priority of 1 has a lowest priority.

With reference to the ninth possible implementation of the third aspect, the tenth possible implementation of the third aspect, the eleventh possible implementation of the third aspect, or the twelfth possible implementation of the third aspect, in a thirteenth possible implementation of the third aspect, the power reducing subunit is specifically configured to:

when multiple transmission objects have a same priority, perform equal power reduction for the multiple transmission objects that have the same priority.

According to a fourth aspect, a base station is provided and includes:

an acquiring unit, configured to acquire a first transmission object set, where the first transmission object set includes all to-be-transmitted uplink channels and/or sounding reference signals SRSs of a user equipment, and configured to acquire a maximum transmit power of the user equipment and acquire a priority sequence of information corresponding to the transmission objects;

a power reducing unit, configured to: when a sum of transmit powers acquired by the acquiring unit for all the transmission objects in the first transmission object set is greater than the maximum transmit power of the user equipment, perform a power reduction operation based on the priority sequence of the information corresponding to the transmission objects, so as to acquire an available transmit power of each transmission object in the first transmission object set, where a sum of available transmit powers of all the transmission objects in the first transmission object set is less than or equal to the maximum transmit power of the user equipment;

a determining unit, configured to determine, from the first transmission object set and according to the available transmit power acquired by the power reducing unit for each transmission object in the first transmission object set, a second transmission object set that needs to be scheduled, where an available transmit power of a transmission object in the second transmission object set is not 0; and a scheduling unit, configured to perform scheduling for the user equipment according to the second transmission object set determined by the determining unit.

With reference to the fourth aspect, in a first possible implementation of the fourth aspect, the acquiring unit is specifically configured to:

acquire the priority sequence of the information corresponding to the transmission objects, wherein the priority sequence of the information corresponding to the transmission objects comprises at least one of the following: a priority sequence of a type of a transmission object, a priority sequence of uplink control information UCI carried in a transmission object, and a priority sequence of a carrier corresponding to a transmission object.

With reference to the fourth aspect or the first possible implementation of the fourth aspect, in a second possible implementation of the fourth aspect, the power reducing unit includes:

a determining subunit, configured to determine a priority of each transmission object in the first transmission object set according to the priority sequence of the information corresponding to the transmission objects and corresponding information of each transmission object in the first transmission object set; and a power reducing subunit, configured to perform the power reduction operation according to the priority determined by the determining subunit for each transmission object in the first transmission object set.

With reference to the second possible implementation of the fourth aspect, in a third possible implementation of the fourth aspect, the power reducing subunit is specifically configured to:

perform the power reduction operation for the transmission objects in the first transmission object set one by one according to the priorities of the transmission objects, with a transmission object of a lowest priority being the first to undergo the power reduction, until a sum of acquired available transmit powers of all the transmission objects in the first transmission object set is less than or equal to the maximum transmit power.

With reference to the third possible implementation of the fourth aspect, in a fourth possible implementation of the fourth aspect, the power reducing subunit is specifically configured to:

perform the power reduction operation for the transmission objects in the first transmission object set one by one according to the priorities of the transmission objects, with a transmission object of a lowest priority being the first to undergo the power reduction, until the sum of the acquired available transmit powers of all the transmission objects in the first transmission object set is less than or equal to the maximum transmit power, where when performing the power reduction for the transmission objects in the first transmission object set one by one according to the priorities of the transmission objects, with a transmission object of a lowest priority being the first to undergo the power reduction, it is satisfied that if an available transmit power for a priority of n is not 0, an available transmit power of a transmission object with a priority of n+1 is equal to an initial transmit power of the transmission object with the priority of n+1, where m is the number of transmission objects in the first transmission object set, m≥n≥1, and a transmission object with a priority of 1 has a lowest priority.

According to a fifth aspect, a user equipment is provided and includes:

a processor, configured to acquire an initial transmit power of each transmission object in a transmission object set, and acquire a priority sequence of information corresponding to the transmission objects and a maximum transmit power, wherein the transmission object set comprises all to-be-transmitted uplink channels and/or sounding reference signals SRSs; when a sum of initial transmit powers of all the transmission objects in the transmission object set is greater than the maximum transmit power, perform a power reduction operation based on the priority sequence of the information corresponding to a transmission object, so as to acquire an available transmit power of each transmission object in the transmission object set, wherein a sum of available transmit powers of all the transmission objects in the transmission object set is not greater than the maximum transmit power; and a sender, configured to send each transmission object in the transmission object set according to the available transmit power that is acquired by the processor and is corresponding to each transmission object in the transmission object set.

According to the fifth aspect, in a first possible implementation of the fifth aspect, the processor is specifically configured to:

acquire the priority sequence of the information corresponding to the transmission object, wherein the priority sequence of the information corresponding to the transmission object comprises at least one of the following: a priority sequence of a type of a transmission object, a priority sequence of UCI carried in a transmission object, and a priority sequence of a carrier corresponding to a transmission object.

With reference to the first possible implementation of the fifth aspect, in a second possible implementation of the fifth aspect, the processor is specifically configured to acquire the priority sequence of a type of a transmission object, wherein the priority sequence of the type of the transmission object includes at least one of the following:

when a physical random access channel PRACH exists, the PRACH has a highest priority;

when a physical uplink control channel PUCCH and a physical uplink shared channel PUSCH coexist, a priority of the PUCCH is higher than a priority of the PUSCH, or a priority of the PUCCH is higher than a priority of a PUSCH not carrying UCI and is the same as a priority of a PUSCH carrying UCI;

when a PUSCH carrying uplink control information UCI and a PUSCH not carrying UCI coexist, a priority of the PUSCH carrying UCI is higher than a priority of the PUSCH not carrying UCI; and when a PRACH, a PUCCH, a PUSCH, and an SRS coexist, the SRS has a lowest priority.

With reference to the first possible implementation of the fifth aspect or the second possible implementation of the fifth aspect, in a third possible implementation of the fifth aspect, the processor is specifically configured to:

acquire the priority sequence of the UCI carried in the transmission object, wherein the priority sequence of the UCI carried in the transmission object includes at least one of the following:

when channel state information and a scheduling request exist, a priority of the channel state information is lower than a priority of the scheduling request; and when hybrid automatic repeat request information and a scheduling request exist, a priority of the hybrid automatic repeat request information is higher than or equal to a priority of the scheduling request.

With reference to the third possible implementation of the fifth aspect, in a fourth possible implementation of the fifth aspect, the processor is specifically configured to: acquire the priority sequence of the UCI carried in the transmission object, wherein the priority sequence of the UCI carried in the transmission object includes at least one of the following:

when channel state information exists and the channel state information includes a channel quality indicator and a precoding matrix, a priority of the channel quality indicator is equal to a priority of the precoding matrix; and when channel state information exists and the channel state information includes a rank indicator, a channel quality indicator, and a precoding matrix, the rank indicator has a highest priority.

With reference to the first possible implementation of the fifth aspect, the second possible implementation of the fifth aspect, the third possible implementation of the fifth aspect, or the fourth possible implementation of the fifth aspect, in a fifth possible implementation of the fifth aspect, the processor is specifically configured to acquire the priority sequence of the carrier corresponding to the transmission object, wherein the priority sequence of the carrier corresponding to the transmission object comprises at least one of the following: a priority sequence determined based on a index sequence number of a carriers, a carrier priority sequence configured by an upper layer, a priority sequence determined based on a duplex mode of a carrier, a priority sequence determined based on a radio resource control RRC connection state of a carriers, and a priority sequence determined based on a transmission point corresponding to a carrier.

With reference to the fifth possible implementation of the fifth aspect, in a sixth possible implementation of the fifth aspect, the processor is specifically configured to acquire the priority sequence determined based on the RRC connection state of the carrier, wherein the priority sequence determined based on the RRC connection state of the carrier includes at least one of the following:

a priority of a carrier supporting RRC connection is higher than a priority of a carrier not supporting RRC connection; and a priority of a carrier carrying RRC information is higher than a priority of a carrier not carrying RRC information.

With reference to the fifth or the sixth possible implementation of the fifth aspect, in a seventh possible implementation of the fifth aspect, the processor is specifically configured to acquire the priority sequence determined based on the duplex mode of the carrier, wherein the priority sequence determined based on the duplex mode of the carrier comprises that a priority of a carrier whose duplex mode is frequency division duplex FDD is lower than a priority of a carrier whose duplex mode is time division TDD.

With reference to the fifth aspect, in an eighth possible implementation of the fifth aspect, the processor is specifically configured to acquire the priority sequence of the information corresponding to the transmission object, wherein the priority sequence of the information corresponding to the transmission object includes at least one of the following:

a priority of a PUCCH transmitted on a carrier whose duplex mode is FDD is lower than a priority of a PUCCH transmitted on a carrier whose duplex mode is TDD, and both the PUCCH transmitted on the FDD carrier and the PUCCH transmitted on the TDD carrier carry hybrid automatic repeat request information; and a priority of a PUCCH transmitted on a carrier whose duplex mode is FDD is lower than a priority of a PUSCH that carries UCI and is transmitted on a carrier whose duplex mode is TDD, where the UCI in the UCI-carrying PUSCH transmitted on the TDD carrier includes hybrid automatic repeat request information.

With reference to the fifth aspect, the first possible implementation of the fifth aspect, the second possible implementation of the fifth aspect, the third possible implementation of the fifth aspect, the fourth possible implementation of the fifth aspect, the fifth possible implementation of the fifth aspect, the sixth possible implementation of the fifth aspect, or the seventh possible implementation of the fifth aspect, in a ninth possible implementation of the fifth aspect, the processor is specifically configured to:

determine a priority of each transmission object in the transmission object set according to the priority sequence of the information corresponding to the transmission objects and corresponding information of each transmission object in the transmission object set, and perform the power reduction operation according to the priority of each transmission object in the transmission object set.

With reference to the ninth possible implementation of the fifth aspect, in a tenth possible implementation of the fifth aspect, the processor is specifically configured to:

determine the priority of each transmission object in the transmission object set according to a priority sequence of a type of a transmission object and a type of each transmission object in the transmission object set, wherein the priority sequence of the type of the transmission object is comprised in the priority sequence of the information corresponding to the transmission object; and when some of the transmission objects have a same priority after the priority of the each transmission object in the transmission object set is determined according to a priority sequence of a type of a transmission object and a type of the each transmission object in the transmission object set, determine a priority of each transmission object in same-priority transmission objects according to a priority sequence of UCI carried in a transmission object and UCI of each transmission object in the same-priority transmission objects, wherein the priority sequence of the UCI carried in the transmission object is comprised in the priority sequence of the information corresponding to the transmission objects, or determine a priority of each transmission object in same-priority transmission objects according to a priority sequence of a carrier corresponding to a transmission object and a carrier corresponding to each transmission object in the same-priority transmission objects, wherein the priority sequence of the carrier corresponding to the transmission object is comprised in the priority sequence of the information corresponding to the transmission objects.

With reference to the ninth possible implementation of the fifth aspect or the tenth possible implementation of the fifth aspect, in an eleventh possible implementation of the fifth aspect, the processor is specifically configured to:

perform the power reduction operation for the transmission objects in the transmission object set one by one according to the priorities of the transmission objects, with a transmission object of a lowest priority being the first to undergo the power reduction, until a sum of acquired available transmit powers of all the transmission objects in the transmission object set is less than or equal to the maximum transmit power.

With reference to the eleventh possible implementation of the fifth aspect, in a twelfth possible implementation of the fifth aspect, the processor is specifically configured to:

perform the power reduction operation for the transmission objects in the transmission object set one by one according to the priorities of the transmission objects, with a transmission object of a lowest priority being the first to undergo the power reduction, until the sum of the acquired available transmit powers of all the transmission objects in the transmission object set is less than or equal to the maximum transmit power, where when performing the power reduction for the transmission objects in the transmission object set one by one according to the priorities of the transmission objects, with a transmission object of a lowest priority being the first to undergo the power reduction, it is satisfied that if an available transmit power for a priority of n is not 0, an available transmit power of a transmission object with a priority of n+1 is equal to an initial transmit power of the transmission object with the priority of n+1, where m is the number of transmission objects in the transmission object set, m≥n≥1, and a transmission object with a priority of 1 has a lowest priority.

With reference to the ninth possible implementation of the fifth aspect, the tenth possible implementation of the fifth aspect, the eleventh possible implementation of the fifth aspect, or the twelfth possible implementation of the fifth aspect, in a thirteenth possible implementation of the fifth aspect, the processor is specifically configured to:

when multiple transmission objects have a same priority, perform equal power reduction for the multiple transmission objects that have the same priority.

According to a sixth aspect, a base station is provided and includes:

a processor, configured to acquire a first transmission object set, where the first transmission object set includes all to-be-transmitted uplink channels and/or sounding reference signals SRSs of a user equipment, and to acquire a maximum transmit power of the user equipment and a priority sequence of information corresponding to the transmission objects; configured to: when a sum of transmit powers of all the transmission objects in the first transmission object set is greater than the maximum transmit power of the user equipment, perform a power reduction operation based on the priority sequence of the information corresponding to the transmission objects, so as to acquire an available transmit power of each transmission object in the first transmission object set, where a sum of available transmit powers of all the transmission objects in the first transmission object set is less than or equal to the maximum transmit power of the user equipment; configured to determine, from the first transmission object set and according to the available transmit power of each transmission object in the first transmission object set, a second transmission object set that needs to be scheduled, where an available transmit power of a transmission object in the second transmission object set is not 0; and configured to determine scheduling information according to the second transmission object set; and a sender, configured to send the scheduling information to the user equipment, so that the user equipment receives or sends data according to the scheduling.

With reference to the sixth aspect, in a first possible implementation of the sixth aspect, the processor is specifically configured to:

acquire the priority sequence of the information corresponding to the transmission objects, wherein the priority sequence of the information corresponding to the transmission objects comprises at least one of the following: a priority sequence of a type of a transmission object, a priority sequence of uplink control information UCI carried in a transmission object, and a priority sequence of a carrier corresponding to a transmission object.

With reference to the sixth aspect or the first possible implementation of the sixth aspect, in a second possible implementation of the sixth aspect, the processor is specifically configured to:

determine a priority of each transmission object in the first transmission object set according to the priority sequence of the information corresponding to a transmission object and corresponding information of each transmission object in the first transmission object set; and perform the power reduction operation according to the priority of each transmission object in the first transmission object set.

With reference to the second possible implementation of the sixth aspect, in a third possible implementation of the sixth aspect, the processor is configured to: perform the power reduction operation for the transmission objects in the first transmission object set one by one according to the priorities of the transmission objects, with a transmission object of a lowest priority being the first to undergo the power reduction, until a sum of acquired available transmit powers of all the transmission objects in the first transmission object set is less than or equal to the maximum transmit power.

With reference to the third possible implementation of the sixth aspect, in a fourth possible implementation of the sixth aspect, the processor is specifically configured to:

perform the power reduction operation for the transmission objects in the first transmission object set one by one according to the priorities of the transmission objects, with a transmission object of a lowest priority being the first to undergo the power reduction, until the sum of the acquired available transmit powers of all the transmission objects in the first transmission object set is less than or equal to the maximum transmit power, where when performing the power reduction for the transmission objects in the first transmission object set one by one according to the priorities of the transmission objects, with a transmission object of a lowest priority being the first to undergo the power reduction, it is satisfied that if an available transmit power for a priority of n is not 0, an available transmit power of a transmission object with a priority of n+1 is equal to an initial transmit power of the transmission object with the priority of n+1, where m is the number of transmission objects in the first transmission object set, m≥n≥1, and a transmission object with a priority of 1 has a lowest priority.

Therefore, in the embodiments of the present invention, an initial transmit power of each transmission object in a transmission object set is determined, where the transmission object set includes all to-be-transmitted uplink channels and/or SRSs; when a sum of initial transmit powers of all the transmission objects in the transmission object set is greater than a maximum transmit power, a power reduction operation is performed based on a priority sequence of information corresponding to the transmission objects, so as to acquire an available transmit power of each transmission object in the transmission object set, where a sum of available transmit powers of all the transmission objects in the transmission object set is not greater than the maximum transmit power; and each transmission object in the transmission object set is sent according to the available transmit power corresponding to each transmission object in the transmission object set, which can solve the problem in which a sum of transmit powers of all to-be-transmitted objects of a user equipment is greater than a maximum transmit power of the user equipment.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 2 is a schematic flowchart of a power determining method according to another embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the present invention may be applied to various communications systems, such as: a Global System for Mobile Communications ("GSM" for short) system, a Code Division Multiple Access ("CDMA" for short) system, a Wideband Code Division Multiple Access ("WCDMA" for short) system, a general packet radio service ("GPRS" for short), a Long Term Evolution ("LTE" for short) system, an LTE frequency division duplex ("FDD" for short) system, an LTE time division duplex ("TDD" for short), a Universal Mobile Telecommunications System ("UMTS" for short) or the like.

In the embodiments of the present invention, a base station may be a base station ("BTS" for short) in the GSM or CDMA, may also be a base station (NodeB, "NB" for short) in the WCDMA, and may further be an evolved NodeB ("eNB" or "e-NodeB" for short) in the LTE, which is not limited in the present invention.

A user equipment ("UE" for short) may also be referred to as a terminal and may communicate with one or more core networks by using a radio access network ("RAN" for short).

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
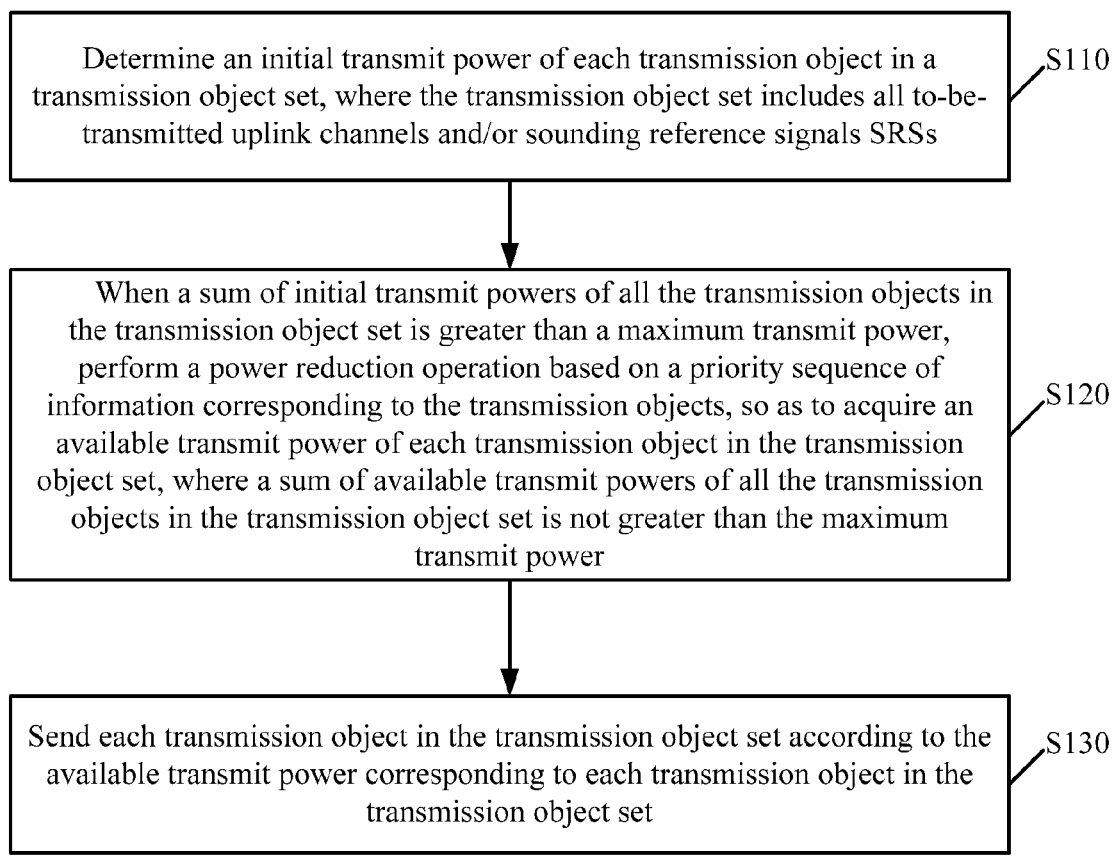
FIG. 1 is a schematic flowchart of a power determining method according to an embodiment of the present invention.

FIG. 1 shows a schematic flowchart of a power determining method 100. The method 100 may be performed by a user equipment. As shown in FIG. 1, the method 100 includes:

S110. Determine an initial transmit power of each transmission object in a transmission object set, where the transmission object set includes all to-be-transmitted uplink channels and/or SRSs.

S120. When a sum of initial transmit powers of all the transmission objects in the transmission object set is greater than a maximum transmit power, perform a power reduction operation based on a priority sequence of information corresponding to the transmission objects, so as to acquire an available transmit power of each transmission object in the transmission object set, where a sum of available transmit powers of all the transmission objects in the transmission object set is not greater than the maximum transmit power.

S130. Send each transmission object in the transmission object set according to the available transmit power corresponding to each transmission object in the transmission object set.

Specifically, when uplink channels and/or SRSs (namely, a transmission object set) corresponding to multiple carriers need to be transmitted simultaneously, a user equipment may first calculate an initial transmit power of each transmission object in the transmission object set. After calculating the initial transmit power of each transmission object, the user equipment may compare a sum of initial transmit powers of all the transmission objects with a maximum transmit power; when the sum of the initial transmit powers of all the transmission objects is less than or equal to the maximum transmit power, the user equipment may directly send each transmission object in the transmission object set, or when the sum of the initial transmit powers of all the transmission objects is greater than the maximum transmit power, the user equipment needs to perform a power reduction operation. Specifically, the user equipment may first determine a priority of each transmission object according to a priority sequence of information corresponding to the transmission objects and corresponding information of each transmission object in the transmission object set, and then may perform a power reduction operation according to the priority of each transmission object, so as to acquire an available transmit power of each transmission object in the transmission object set, where a sum of available transmit powers of all the transmission objects in the transmission object set is not greater than the maximum transmit power. After acquiring the available transmit power of each transmission object in the transmission object set, the user equipment may send each transmission object in the transmission object set according to the available transmit power corresponding to each transmission object in the transmission object set.

It should be noted that, in an actual implementation process, due to a device reason or some other reasons, the sum of the available transmit powers of all the transmission objects in the transmission object set may exceed the maximum transmit power of the user equipment within a very short period of time; however, after the component becomes stable, the sum of the available transmit powers of all the transmission objects in the transmission object set is not greater than the maximum transmit power.

In this embodiment of the present invention, an initial transmit power of a transmission object is a transmit power calculated for the transmission object according to a related power control rule before a user equipment performs a power reduction operation. If a sum of initial transmit powers of all transmission objects to be transmitted by the user equipment does not exceed a maximum transmit power of the user equipment, the user equipment needs to transmit a corresponding transmission object according to the initial transmit power. If the sum of the initial transmit powers of all the transmission objects to be transmitted by the user equipment exceeds the maximum transmit power of the user equipment, the user equipment needs to perform a power reduction operation to acquire an available transmit power of each transmission object.

It should be understood that in this embodiment of the present invention, an available transmit power of a transmission object may be equal to an initial transmit power of the transmission object, or may be not equal to the initial transmit power of the transmission object. For example, for a transmission object with a high priority, an available transmit power of the transmission object may be equal to an initial transmit power thereof; however, for a transmission object with a low priority, an available transmit power of the transmission object may be less than an initial transmit power thereof.

In this embodiment of the present invention, uplink channels and/or SRSs that correspond to multiple carriers and need to be simultaneously transmitted may be uplink channels and/or SRSs that correspond to the multiple carriers and need to be transmitted in a same subframe. However, since subframe numbers for sending different uplink channels and/or SRSs may not be the same, the uplink channels and/or SRSs that correspond to the multiple carriers and need to be simultaneously transmitted may also be construed as objects that need to be transmitted at a time point or within a period of time.

In this embodiment of the present invention, the transmission object set includes all to-be-transmitted uplink channels and/or SRSs, which means that: in a case in which only uplink channels need to be transmitted, the transmission object set includes all the to-be-transmitted uplink channels; in a case in which only SRSs need to be transmitted, the transmission object set includes all the to-be-transmitted SRSs; and in a case in which both uplink channels and SRSs need to be transmitted, the transmission object set includes all the to-be-transmitted uplink channels and all the to-be-transmitted SRSs.

It should be understood that in this embodiment of the present invention, the priority sequence of the information corresponding to the transmission objects may be preset, or may be dynamically set by the user equipment according to an upper-layer configuration, or may be acquired by the user equipment by using another approach, which is not limited by this embodiment of the present invention.

In this embodiment of the present invention, the priority sequence of the information corresponding to the transmission objects may include at least one of the following:

a priority sequence of types of the transmission objects, a priority sequence of UCI carried in the transmission objects, and a priority sequence of carriers corresponding to the transmission objects.

In this embodiment of the present invention, the performing a power reduction operation based on a priority sequence of information corresponding to the transmission objects may include:

determining a priority of each transmission object in the transmission object set according to the priority sequence of the information corresponding to the transmission objects and corresponding information of each transmission object in the transmission object set, where in all the embodiments of the present invention, corresponding information of a transmission object may indicate a type corresponding to the transmission object, for example, a corresponding type of one transmission object may be: a PRACH channel, a PUCCH channel, a PUSCH channel (which may be specifically a PUSCH channel carrying UCI or a PUSCH channel not carrying UCI), or an SRS channel; corresponding information of a transmission object may indicate information carried in the transmission object, for example, corresponding information of one transmission object may be uplink control information UCI, PUSCH data, or SRS; or corresponding information of a transmission object may indicate information of a carrier corresponding to the transmission object; and performing the power reduction operation according to the priority of each transmission object in the transmission object set.

In this embodiment of the present invention, the user equipment may determine the priority of each transmission object in the transmission object set only according to the priority sequence of the types of the transmission objects and a type of each transmission object in the transmission object set; may determine the priority of each transmission object in the transmission object set only according to the priority sequence of the UCI carried in the transmission objects and UCI carried in each transmission object in the transmission object set; or apparently, may also determine the priority of each transmission object only according to the priority sequence of the carriers corresponding to the transmission objects and a carrier corresponding to each transmission object in the transmission object set.

In this embodiment of the present invention, the user equipment may also first determine the priority of each transmission object according to one of the following criteria: the priority sequence of the types of the transmission objects, the priority sequence of the UCI carried in the transmission objects, and the priority sequence of the carriers corresponding to the transmission objects. In the event that there are transmission objects sharing a same priority, the user equipment then determines a priority of same-priority transmission objects according to one or two of the following criteria other than the selected criterion: the priority sequence of the types of the transmission objects, the priority sequence of the UCI carried in the transmission objects, and the priority sequence of the carriers corresponding to the transmission objects.

For example, a priority of each transmission object in a transmission object set S may be first determined according to a priority sequence of types of transmission objects. If it is determined, according to the priority sequence of the types of the transmission objects, that priorities of multiple transmission objects are the same, and if it is assumed that the multiple same-priority transmission objects determined according to the priority sequence of the types of the transmission objects form a transmission object set S1, a priority of each transmission object in the transmission object set S1 is then further determined according to a priority sequence of UCI carried in the transmission objects. If it is determined, according to the priority sequence of the UCI carried in the transmission objects, that priorities of multiple transmission objects in the transmission object set S1 are the same, and if it is assumed that the multiple same-priority transmission objects in the transmission object set S1 form a set S2, a priority of each transmission object in the set S2 is then further determined according to a priority sequence of carriers corresponding to the transmission objects. If the set S2, which is formed from the multiple same-priority transmission objects in the transmission object set S1, includes a PUCCH1 carrying an HARQ-ACK for transmission and a PUCCH2 carrying an HARQ-ACK for transmission, prioritization may also be performed according to the number of HARQ-ACK bits to be transmitted on the PUCCH1 and PUCCH2, for example, a PUCCH with more HARQ-ACK bits has a higher priority than a PUCCH with fewer HARQ-ACK bits.

For example, the user equipment may determine the priority of each transmission object in the transmission object set according to the priority sequence of the types of the transmission objects and the type of each transmission object in the transmission object set; and when some of the transmission objects have a same priority after the priority of the each transmission object in the transmission object set is determined according to a priority sequence of a type of a transmission object and a type of the each transmission object in the transmission object set, determine a priority of each transmission object among same-priority transmission objects according to the priority sequence of the UCI carried in the transmission objects and UCI carried in each transmission object in the same-priority transmission objects, or determine a priority of each transmission object in same-priority transmission objects according to the priority sequence of the carriers corresponding to the transmission objects and a carrier corresponding to each transmission object in the same-priority transmission objects.

In this embodiment of the present invention, the types of the transmission objects may be classified into PRACH, PUCCH, PUSCH carrying UCI, PUSCH not carrying UCI, and SRS, where the priority sequence of the types of the transmission objects may include at least one of the following:

when a PRACH exists, the PRACH has a highest priority;

when a PUCCH and a PUSCH coexist, a priority of the PUCCH is higher than a priority of the PUSCH, or a priority of the PUCCH is higher than a priority of a PUSCH not carrying UCI and is the same as a priority of a PUSCH carrying UCI;

when a PUSCH carrying uplink control information UCI and a PUSCH not carrying UCI coexist, a priority of the PUSCH carrying UCI is higher than a priority of the PUSCH not carrying UCI; and when a PRACH, a PUCCH, a PUSCH, and an SRS coexist, the SRS has a lowest priority.

Specifically, the priority sequence of the types of the transmission objects may also be that: a priority of a PRACH is higher than a priority of a PUCCH, a priority of a PUCCH is higher than a priority of a PUSCH carrying UCI, a priority of a PUSCH carrying UCI is higher than a priority of a PUSCH not carrying UCI, and a priority of a PUSCH not carrying UCI is higher than a priority of an SRS. Alternatively, the priority sequence of the types of the transmission objects may also be that: a priority of a PRACH is higher than a priority of a PUCCH, a priority of a PUCCH is equal to a priority of a PUSCH carrying UCI, a priority of a PUSCH carrying UCI is higher than a priority of a PUSCH not carrying UCI, and a priority of a PUSCH not carrying UCI is higher than a priority of an SRS.

In this embodiment of the present invention, if a priority of a PUCCH is the same as a priority of a PUSCH carrying UCI, relatively important UCI information can be better protected in some application scenarios. For example, when UCI in a UCI-carrying PUSCH is an HARQ-ACK and UCI carried in a PUCCH is channel state information, a priority of the PUCCH and a priority of the PUSCH carrying UCI are first set to be the same, and then the PUCCH and the PUSCH carrying UCI that have a same priority are further prioritized according to a priority of the carried UCI, to be specific, it can be determined that the PUSCH carrying hybrid automatic repeat request information has a higher priority. In this way, higher protection is provided for the hybrid automatic repeat request information and transmission performance for this type of important information is guaranteed. Same or similar effects can be achieved in a dual connectivity scenario, or in a scenario in which UCI can be simultaneously transmitted on multiple uplink carriers, or in a scenario in which multiple PUCCHs are allowed for simultaneous transmission on multiple carriers.

In this embodiment of the present invention, UCI carried in a transmission object may be classified into hybrid automatic repeat request information, a scheduling request, and channel state information, where the priority sequence of the UCI carried in the transmission objects may include at least one of the following:

when channel state information and a scheduling request exist, a priority of the channel state information is lower than a priority of the scheduling request; and when hybrid automatic repeat request information and a scheduling request exist, a priority of the hybrid automatic repeat request information is higher than or equal to a priority of the scheduling request.

In this embodiment of the present invention, the priority sequence of the UCI carried in the transmission objects may include at least one of the following:

when channel state information exists and the channel state information includes a channel quality indicator and a precoding matrix, a priority of the channel quality indicator is equal to a priority of the precoding matrix; and when channel state information exists and the channel state information includes a rank indicator, a channel quality indicator, and a precoding matrix, the rank indicator has a highest priority.

It should be understood that in this embodiment of the present invention, the determining the priority of each transmission object according to the UCI carried in the transmission objects may be: determining the priority of each transmission object according to a priority of UCI content that has a highest priority among contents of a respective UCI carried in each transmission object, for example, UCI information carried in a PUCCH channel 1 includes only a scheduling request, and UCI information carried in a PUCCH channel 2 includes only a channel quality indicator and a precoding matrix; in this case, if prioritization is performed according to a priority of carried content that has a highest priority, a priority of the PUCCH channel 1 is higher than a priority of the PUCCH channel 2.

In this embodiment of the present invention, the priority sequence of the carriers corresponding to the transmission objects may include at least one of the following:

a priority sequence determined based on index sequence numbers of the carriers, a carrier priority sequence configured by an upper layer, a priority sequence determined based on duplex modes of the carriers, a priority sequence determined based on transmission points corresponding to the carriers, and a priority sequence determined based on an RRC connection state of carriers.

In this embodiment of the present invention, indexes of carriers may be preconfigured, where the preconfigured carrier indexes may be set according to importance of the carriers to the user equipment. If indexing is performed in descending order of importance, that is to say, a carrier of high importance is assigned a small index, a priority rule corresponding to the carrier indexes is that the carrier indexes are sequenced from highest to lowest priority and a carrier with a small carrier index has a high priority. Apparently, indexing may also be performed in ascending order of importance, that is to say, a carrier of high importance is assigned a large index; in this case, a priority rule corresponding to the carrier indexes is that the carrier indexes are sequenced from highest to lowest priority and a carrier with a small carrier index has a lower priority.

In this embodiment of the present invention, a priority sequence corresponding to carriers, from highest to lowest priority, may be configured by an upper layer, specifically, the priority sequence may be notified by the upper layer by using semi-static signaling.

In this embodiment of the present invention, carriers may correspond to corresponding transmission points, or may correspond to corresponding base stations, for example, a carrier 1 comes from a macro base station, and a carrier 2 comes from a pico base station; in this case, priorities of the carriers are priorities of the transmission points or priorities of the base stations. In an example of aggregating two uplink carriers for the user equipment, the priorities corresponding to the carriers may be that: a priority of a carrier corresponding to a macro base station (Macro) is higher than a priority of a carrier corresponding to a pico base station (Pico). This case is mainly seen in a scenario in which radio resource control ("RRC" for short) control information and/or a semi-persistent scheduling SPS service of the user equipment is to be transmitted, because better protection can be provided for RRC control information and/or semi-persistent scheduling ("SPS" for short) service data.

In this embodiment of the present invention, the priority sequence of the carriers corresponding to the transmission objects may include: a priority sequence determined based on duplex modes of the carriers, for example, a priority of a carrier whose duplex mode is frequency division duplex (FDD) is lower than a priority of a carrier whose duplex mode is time division duplex (TDD).

Specifically, the priority sequence based on the information corresponding to the transmission objects may include at least one of the following:

a priority of a PUCCH transmitted on a carrier whose duplex mode is frequency division duplex is lower than a priority of a PUCCH transmitted on a carrier whose duplex mode is TDD; in this case, the PUCCH transmitted on the FDD carrier and the PUCCH transmitted on the TDD carrier may be PUCCHs carrying hybrid automatic repeat request information; and a priority of a PUCCH transmitted on a carrier whose duplex mode is FDD is lower than a priority of a PUSCH that carries UCI and is transmitted on a carrier whose duplex mode is TDD; in this case, the UCI in the UCI-carrying PUSCH transmitted on the TDD carrier includes hybrid automatic repeat request information.

In all the embodiments of the present invention, when the priority sequence of the carriers corresponding to the transmission objects is determined based on duplex modes of the carriers, it is beneficial to a scenario in which both TDD and FDD are applied. For example, in this scenario, if a PUCCH transmitted on a carrier whose duplex mode is FDD and a PUCCH transmitted on a carrier whose duplex mode is TDD coexist and both the PUCCHs are PUCCHs carrying hybrid automatic repeat request information, generally, the PUCCH transmitted on the TDD carrier carries HARQ-ACKs of multiple downlink subframes, and the PUCCH transmitted on the FDD carrier carries an HARQ-ACK of only one downlink subframe. In this case, according to the priority sequence determined based on carrier duplex modes, a priority of the PUCCH transmitted on the TDD carrier is higher than a priority of the PUCCH transmitted on the FDD carrier, which in turn ensures PUCCH transmission performance on the TDD carrier, and eliminates the need to retransmit data of the multiple downlink subframes on the TDD carrier, and ultimately improves system performance.

In this embodiment of the present invention, the priority sequence of the carriers corresponding to the transmission objects may include a priority sequence determined based on RRC connection states of carriers, for example, a priority of a carrier supporting RRC connection is higher than a priority of a carrier not supporting RRC connection, or a priority of a carrier carrying RRC information is higher than a priority of a carrier not carrying RRC information. In this embodiment of the present invention, the user equipment may first determine a priority of a transmission object according to the priority sequence determined based on the RRC connection states. For example, if a carrier 1 is a carrier supporting RRC connection and a carrier 2 is a carrier not supporting RRC connection, a priority of the carrier 1 is higher than a priority of the carrier 2, regardless of types of transmission objects corresponding to the carrier 1 and the carrier 2, or regardless of UCI carried in transmission objects corresponding to the carrier 1 and the carrier 2. When there are still same-priority transmission objects after the priorities of the transmission objects are determined according to the priority sequence determined based on the RRC connection states, the priorities of the transmission objects may be further determined according to priorities of corresponding types of the transmission objects and/or priorities of the UCI carried in the transmission objects.

In this embodiment of the present invention, the performing the power reduction operation according to the priority of each transmission object may include:

performing the power reduction operation for the transmission objects in the transmission object set one by one according to the priorities of the transmission objects, with a transmission object of a lowest priority being the first to undergo the power reduction, until a sum of acquired available transmit powers of all the transmission objects in the transmission object set is less than or equal to the maximum transmit power.

In this embodiment of the present invention, when performing the power reduction for the transmission objects one by one according to the priorities of the transmission objects, with a transmission object of a lowest priority being the first to undergo the power reduction, it is satisfied that if an available transmit power of a transmission object with a priority of n is not 0, an available transmit power of a transmission object with a priority of n+1 is equal to an initial transmit power of the transmission object with the priority of n+1, where m is the number of transmission objects in the transmission object set, m≥n≥1, and a transmission object with a priority of 1 has a lowest priority.

That is to say, after the priority of each transmission object is determined based on the priority sequence, power reduction may be first performed on transmit power of a transmission object with a lowest priority. If an initial transmit power of the transmission object with a lowest priority can satisfy a condition for starting power reduction, specifically, the initial transmit power of the transmission object with a lowest priority is greater than a difference between the initial transmit power of each transmission object in the transmission object set and the maximum transmit power of the user equipment, power reduction is performed only on the transmission object with a lowest priority to obtain an available transmit power of the transmission object with a lowest priority, and available transmit powers of other transmission objects are equal to their initial transmit powers. If the initial transmit power of the transmission object with a lowest priority cannot satisfy the condition for starting power reduction, power reduction is first performed on the transmission object with a lowest priority to obtain its available transmit power, which is 0, and then power reduction is performed on a transmission object with a second lowest priority. If an initial transmit power of the transmission object with the second lowest priority can satisfy a condition for starting power reduction, specifically, a sum of the initial transmit power of the transmission object with a lowest priority and the initial transmit power of the transmission object with the second lowest priority is greater than the difference between the initial transmit power of each transmission object in the transmission object set and the maximum transmit power of the user equipment, power reduction is performed on the transmission object with the second lowest priority to obtain its available transmit power, and available transmit powers of other transmission objects (other transmission objects than the transmission object with the second lowest priority and the transmission object with a lowest priority, in the transmission object set) are equal to their initial transmit powers. If the initial transmit power of the transmission object with the second lowest priority cannot satisfy the condition for starting power reduction, power reduction is performed on a transmission object with the third lowest priority, and so on, until the sum of the available transmit powers of all the transmission objects in the transmission object set is less than or equal to the maximum transmit power of the user equipment.

In this embodiment of the present invention, when there are multiple transmission objects with a same priority, equal power reduction is performed on the multiple transmission objects with the same priority.

In this embodiment of the present invention, an operation of equal power reduction may be to perform equal power reduction on objects requiring power reduction according to a ratio of initial transmit power to available transmit power, where the ratio is the same for each transmission object undergoing power reduction; or may be to subtract a same amount of power from initial transmit power of an object requiring power reduction.

It is assumed that same-priority transmission objects requiring power reduction include transmission objects A, B, and C, where an initial transmit power corresponding to the transmission object A is a, an initial transmit power corresponding to the transmission object B is b, a transmit power of the transmission object C is c, and an amount of power that needs to be reduced is d. An equal power reduction operation may be directly performed on all the transmission objects according to a ratio, specifically, a coefficient w may be obtained according to a formula w·(a+b+c)=d, so as to obtain power that needs to be reduced for the transmission objects A, B, and C, which is wa, wb, and wc, respectively, that is, available transmit power is a-wa, b-wb, and c-wc, respectively. Alternatively, a same amount of power may also be subtracted from the initial transmit powers of the transmission objects requiring power reduction, specifically, e may be obtained according to a formula 3e=d; the amount of power that needs to be reduced for the transmission objects A, B, and C is d/3, that is to say, available transmit powers are a-d/3, b-d/3, and c-d/3, respectively.

It should be understood that power reduction may also be performed on transmission objects in other manners in this embodiment of the present invention. For example, power reduction may be performed on all the transmission objects, for example, according to a formula ma+nb+pc=D, where a numerical value relationship between m, n, and p may be determined according to priorities of corresponding transmission objects, so as to obtain transmit powers of the transmission objects A, B and C, which are ma, nb, and pc, respectively.

Apparently, in this embodiment of the present invention, power reduction may also be performed in other manners, which is not limited by this embodiment of the present invention.

To understand the present invention more comprehensively, the following describes the power determining method of the present invention with reference to several examples. In the following examples, it is assumed that two uplink carriers, namely, a carrier 1 and a carrier 2, are aggregated for the user equipment, multiple to-be-transmitted transmission objects need to be sent in a same subframe, and a sum of transmit powers of the transmission objects is greater than the maximum transmit power of the user equipment. For ease of description, a transmit power in the following examples is represented by a linear value of transmit power, or apparently, may be represented by another value, for example, an absolute value of transmit power or a relative value of transmit power.

Example 1

To-be-transmitted objects are a PUCCH channel 1 that needs to be transmitted on the carrier 1 and a PUCCH channel 2 that needs to be transmitted on the carrier 2. In this example, only priorities of the channels are compared. The priorities of the two channels are the same, and therefore equal power reduction may be performed on transmit powers of the two PUCCH channels. A reduction coefficient may be obtained according to the following formula: $w \cdot \hat{P}_{PUCCH,1}(i) + w \cdot \hat{P}_{PUCCH,2}(i) = \hat{P}_{CMAX}(i)$, where $\hat{P}_{CMAX}(i)$ is a linear value of maximum transmit power, $\hat{P}_{PUCCH,1}(i)$ is a linear value of initial transmit power of the PUCCH channel 1, and $\hat{P}_{PUCCH,2}(i)$ is a linear value of initial transmit power of the PUCCH channel 2. Therefore, after the power reduction, linear values of transmit powers of the PUCCHs on the carrier 1 and carrier 2 are $w \cdot \hat{P}_{PUCCH,1}(i)$ and $w \cdot \hat{P}_{PUCCH,2}(i)$, respectively.

Example 2

To-be-transmitted objects are a PUCCH channel 1 that needs to be transmitted on the carrier 1 and a PUCCH channel 2 that needs to be transmitted on the carrier 2, where UCI transmitted on the PUCCH channel 1 is hybrid automatic repeat request information and UCI transmitted on the PUCCH channel 2 is a CQI/PMI. Since the two channels are both PUCCH channels, prioritization may be performed according to the UCI separately carried in the two channels. A priority of hybrid automatic repeat request information is higher than a priority of a CQI/PMI, and therefore a priority of the PUCCH channel 1 is higher than a priority of the PUCCH channel 2, which means that a transmit power of the PUCCH on the carrier 2 may be reduced to obtain an available transmit power. In which case, a linear value of the available transmit power of the PUCCH channel 2 on the carrier 2 is $\hat{P}_{PUCCH,2}(i) = \hat{P}_{CMAX}(i) - \hat{P}_{PUCCH,1}(i)$, where $\hat{P}_{CMAX}(i)$ is a linear value of maximum transmit power and $\hat{P}_{PUCCH,1}(i)$ is a linear value (which is equal to a linear value of initial transmit power) of available transmit power of the PUCCH channel 1.

Example 3

To-be-transmitted objects are a PUSCH channel 1 that carries UCI and needs to be transmitted on the carrier 1 and a PUSCH channel 2 that carries UCI and needs to be transmitted on the carrier 2, where the UCI carried in the PUSCH channel 1 is hybrid automatic repeat request information and a CQI/PMI, while the uplink control information carried in the PUSCH channel 2 is a CQI/PMI. Since the two channels are both PUSCHs, prioritization may be performed according to the UCI separately carried in the two channels. A priority of hybrid automatic repeat request information is higher than a priority of a CQI/PMI, and therefore a priority of the PUSCH channel 1 is higher than a priority of the PUSCH channel 2, which means that a transmit power of the PUSCH on the carrier 2 may be reduced to obtain an available transmit power. In which case, a linear value of the available transmit power of the PUSCH channel 2 on the carrier 2 is $\hat{P}_{PUSCH\_UCI,2}(i) = \hat{P}_{CMAX}(i) - \hat{P}_{PUSCH\_UCI,1}(i)$, where $\hat{P}_{CMAX}(i)$ is a linear value of maximum transmit power and $\hat{P}_{PUSCH\_UCI,1}(i)$ is a linear value of available transmit power (which is equal to a linear value of initial transmit power) of the PUSCH channel 1.

Example 4

In the two uplink carriers aggregated for the user equipment, the carrier 1 comes from a macro base station, and the carrier 2 comes from a pico base station. If channels to be transmitted by the user equipment in the subframe are two PUSCH channels, to-be-transmitted objects are a PUSCH channel 1 that does not carry UCI and needs to be transmitted on the carrier 1, and a PUSCH channel 2 that does not carry UCI and needs to be transmitted on the carrier 2. Since the carrier 1 comes from a macro base station and the carrier 2 comes from a pico base station, a priority of the PUSCH channel 1 is higher than a priority of the PUSCH channel 2, which means that a transmit power of the PUSCH channel 2 may be reduced to obtain an available transmit power. In which case, a linear value of the available transmit power of the PUSCH channel 2 corresponding to the pico base station is $\hat{P}_{PUSCH,pico}(i)=\hat{P}_{CMAX}(i)-\hat{P}_{PUSCH,Macro}(i)$, where $\hat{P}_{CMAX}(i)$ is a linear value of maximum transmit power, and $\hat{P}_{PUSCH,Macro}(i)$ is a linear value of available transmit power (which is equal to a linear value of initial transmit power) of the PUSCH channel 1.

Example 5

To-be-transmitted objects are a PUCCH channel 1 that needs to be transmitted on the carrier 1, and a PUSCH channel 1 that carries UCI and needs to be transmitted on the carrier 2. The channels may be compared. Since a priority of a PUCCH channel is higher than a priority of a PUSCH channel, a priority of the PUCCH channel 1 is higher than a priority of the PUSCH channel 1, which means that a transmit power of the PUSCH channel 1 may be reduced to obtain an available transmit power. In which case, a linear value of the available transmit power of the PUSCH channel 1 is $\hat{P}_{PUSCH,1}(i)=\hat{P}_{CMAX}(i)-\hat{P}_{PUCCH,1}(i)$, where $\hat{P}_{CMAX}(i)$ is a linear value of maximum transmit power and $\hat{P}_{PUCCH,1}(i)$ is a linear value of available transmit power (which is equal to a linear value of initial transmit power) of the PUCCH channel 1.

Example 6

To-be-transmitted objects are a PUCCH channel 1 that needs to be transmitted on the carrier 1, a PUSCH channel 1 that does not carry UCI and need to be transmitted on the carrier 1, and a PUSCH channel 2 that does not carry UCI and needs to be transmitted on the carrier 2. Since a priority of a PUCCH channel is higher than a priority of a PUSCH channel, power reduction may be performed on the PUSCH channels. There exist two PUSCH channels, and equal power reduction may be performed on the two PUSCH channels. In which case, available transmit powers of the PUSCH channel 1 and the PUSCH channel 2 may be obtained: $\hat{P}_{PUSCH,1}(i)=\hat{P}_{PUSCH,2}(i)=(\hat{P}_{CMAX}(i)-\hat{P}_{PUCCH,1}(i))/2$, where $\hat{P}_{CMAX}(i)$ is a linear value of maximum transmit power and $\hat{P}_{PUCCH,1}(i)$ is a linear value of available transmit power (which is equal to a linear value of initial transmit power) of the PUCCH channel 1.

Example 7

To-be-transmitted objects are a PUCCH channel 1 that needs to be transmitted on the carrier 1, and a PUSCH channel 1 that carries UCI and needs to be transmitted on the carrier 2, where UCI carried in the PUCCH channel 1 is a CQI/PMI, and the UCI carried in the PUSCH channel 1 is hybrid automatic repeat request information. First, channels corresponding to transmission objects may be compared according to a priority sequence of types of the transmission objects. Since a priority of a PUCCH channel is equal to a priority of a PUSCH channel carrying UCI, prioritization needs to be further performed on the UCI carried in the PUCCH channel 1 and the UCI carried in the PUSCH channel 1 according to a priority sequence of UCI carried in the transmission objects. Since a priority of the hybrid automatic repeat request information is higher than a priority of a CQI/PMI, a priority of the PUCCH channel 1 is lower than a priority of the PUSCH channel 1, which means that a transmit power of the PUCCH on the carrier 1 may be reduced to obtain an available transmit power. In which case, a linear value of the available transmit power of the PUCCH channel 1 on the carrier 1 is $\hat{P}_{PUCCH,1}(i)=\hat{P}_{CMAX}(i)-\hat{P}_{PUSCH,1}(i)$, where $\hat{P}_{CMAX}(i)$ is a linear value of maximum transmit power and $\hat{P}_{PUSCH,1}(i)$ is a linear value of available transmit power (which is equal to a linear value of initial transmit power) of the PUSCH channel 1.

Example 8

To-be-transmitted objects are a PUCCH channel 1 that needs to be transmitted on the carrier 1, and a PUCCH channel 2 that needs to be transmitted on the carrier 2, where UCI transmitted on the PUCCH channel 1 is hybrid automatic repeat request information, and UCI transmitted on the PUCCH channel 2 is also hybrid automatic repeat request information; and the carrier 1 is a carrier whose duplex mode is FDD, and the carrier 2 is a carrier whose duplex mode is TDD. First, channels corresponding to transmission objects may be compared according to a priority sequence of types of the transmission objects. Since the two channels are both PUCCH channels, prioritization needs to be further performed on UCI carried in the PUCCH channel 1 and UCI carried in the PUCCH channel 2 according to a priority sequence of UCI carried in the transmission objects. Since hybrid automatic repeat request information is carried in both channels, prioritization still needs to be further performed on the carrier 1 corresponding to the PUCCH channel 1 and the carrier 2 corresponding to the PUCCH channel 2 according to a priority sequence of carriers corresponding to the transmission objects. The duplex mode of the carrier 1 corresponding to the PUCCH channel 1 is FDD and the duplex mode of the carrier 2 corresponding to the PUCCH channel 2 is TDD, and consequently a priority of the carrier 2 corresponding to the PUCCH channel 2 is higher than a priority of the carrier 1 corresponding to the PUCCH channel 1, which means that a priority of the PUCCH channel 2 is higher than a priority of the PUCCH channel 1, specifically, a transmit power of the PUCCH on the carrier 1 may be reduced to obtain an available transmit power. In which case, a linear value of the available transmit power of the PUCCH channel 1 on the carrier 1 is $\hat{P}_{PUCCH,1}(i)=\hat{P}_{CMAX}(i)-\hat{P}_{PUCCH,2}(i)$, where $\hat{P}_{CMAX}(i)$ is a linear value of maximum transmit power and $\hat{P}_{PUCCH,2}(i)$ is a linear value of available transmit power (which is equal to a linear value of initial transmit power) of the PUCCH channel 2.

It should be understood that the foregoing examples are merely specific implementations of this embodiment of the present invention, and this embodiment of the present invention may also be practiced in other manners. For example, in Example 5, comparison may be not performed according to a channel type; instead, carried UCI may be directly compared. Referring again to Example 5, if UCI carried in the PUCCH channel 1 is a channel quality indicator/precoding matrix indicator and UCI carried in a PUSCH channel 1 is a scheduling request, the priority of the PUCCH channel 1 is lower than the priority of the PUSCH channel 1. In which case, power reduction needs to be performed on the transmit power of the PUCCH.

Therefore, according to the power determining method in this embodiment of the present invention, an initial transmit power of each transmission object in a transmission object set is determined, where the transmission object set includes all to-be-transmitted uplink channels and/or SRSs; when a sum of initial transmit powers of all the transmission objects in the transmission object set is greater than a maximum transmit power, a power reduction operation is performed based on a priority sequence of information corresponding to the transmission objects, so as to acquire an available transmit power of each transmission object in the transmission object set, where a sum of available transmit powers of all the transmission objects in the transmission object set is not greater than the maximum transmit power; and each transmission object in the transmission object set is sent according to the respective available transmit power corresponding to each transmission object in the transmission object set, which can solve the problem in which a sum of transmit powers of all to-be-transmitted objects of a user equipment is greater than a maximum transmit power of the user equipment.

The foregoing has described the power determining method from a user equipment side with reference to FIG. 1. The following describes the power determining method from a base station side with reference to FIG. 2.

FIG. 2 is a schematic flowchart of a power determining method 200 according to an embodiment of the present invention. As shown in FIG. 2, the method 200 includes:

S210. Determine a first transmission object set, where the first transmission object set includes all to-be-transmitted uplink channels and/or SRSs of a user equipment.

S220. When it is determined that a sum of transmit powers of all transmission objects in the first transmission object set is greater than a maximum transmit power of the user equipment, perform a power reduction operation based on a priority sequence of information corresponding to the transmission objects, so as to acquire an available transmit power of each transmission object in the first transmission object set, where a sum of available transmit powers of all the transmission objects in the first transmission object set is less than or equal to the maximum transmit power of the user equipment.

S230. Determine, from the first transmission object set and according to the available transmit power of each transmission object in the first transmission object set, a second transmission object set that needs to be scheduled, where an available transmit power of each transmission object in the second transmission object set is not 0.

S240. Perform scheduling for the user equipment according to the second transmission object set.

Specifically, when a base station needs to perform uplink data scheduling for a user equipment, the base station may determine a first transmission object set for the user equipment, where the first transmission object set includes all uplink channels and/or SRSs to be transmitted by the user equipment, specifically, the first transmission object set not only includes all uplink channels and/or SRSs that need to be fed back to the base station by the user equipment, but also includes all uplink channels and/or SRSs that need to be fed back to another base station by the user equipment. After determining the first transmission object set for the user equipment, the base station may determine an initial transmit power of each transmission object in the first transmission object set. When a sum of initial transmit powers of all the transmission objects in the first transmission object set is greater than a maximum transmit power of the user equipment, the base station may determine a priority of each transmission object in the first transmission object set based on a priority sequence of information corresponding to the transmission objects, and then, may perform a power reduction operation according to the priority of each transmission object, so as to acquire an available transmit power of each transmission object in the first transmission object set, where a sum of available transmit powers of all the transmission objects in the first transmission object set is less than or equal to the maximum transmit power of the user equipment. Then, the base station may determine, according to the available transmit power of each transmission object in the first transmission object set and transmission objects that need to be fed back to the base station, a second transmission object set that needs to be scheduled by the base station, where an available transmit power of a transmission object in the second transmission object set is not 0, and transmission objects in the second transmission object set are transmission objects that need to be scheduled by the base station. The base station may perform scheduling for the user equipment after determining the second transmission object set that needs to be scheduled by the base station.

In this embodiment of the present invention, the base station may determine, according to an actual situation, uplink channels and/or SRSs that need to be transmitted to another base station by the user equipment, for example, determine, according to an upper-layer parameter configuration of the user equipment, time of feeding back periodic channel state information or SRSs to another base station by the user equipment; or the base station may determine, according to a current service condition of the user equipment, scheduling that may be performed by another base station for the user equipment, so as to obtain the first transmission object set for the user equipment, which means that, not only all uplink channels and/or SRSs that need to be fed back to the base station by the user equipment are included, but also all uplink channels and/or SRSs that need to be fed back to another base station by the user equipment are included.

In this embodiment of the present invention, the second transmission object set may be formed from all transmission objects that need to be scheduled by the base station and whose available transmit power is not 0, or may be formed from a part of transmission objects that need to be scheduled by the base station and whose available transmit power is not 0, for example, the second transmission object set may be formed from transmission objects that need to be scheduled by the base station and whose available transmit power is not 0 and whose priority is greater than a predetermined threshold, or formed by transmission objects that need to be scheduled by the base station and whose available transmit power is not 0 and meets the requirement that a ratio of available transmit power to initial transmit power is greater than a predetermined threshold.

It should be understood that in this embodiment of the present invention, the priority sequence of the information corresponding to the transmission objects may be preset, or may be dynamically set by the user equipment according to an upper-layer configuration, or may be acquired by the user equipment by using another approach, which is not limited by this embodiment of the present invention.

In this embodiment of the present invention, the priority sequence of the information corresponding to the transmission objects may include at least one of the following:

a priority sequence of types of the transmission objects, a priority sequence of UCI carried in the transmission objects, and a priority sequence of carriers corresponding to the transmission objects.

In this embodiment of the present invention, the priority sequence of the types of the transmission objects may include at least one of the following:

when a physical random access channel PRACH exists, the PRACH has a highest priority;

when a physical uplink control channel PUCCH and a physical uplink shared channel PUSCH coexist, a priority of the PUCCH is higher than a priority of the PUSCH, or a priority of the PUCCH is higher than a priority of a PUSCH not carrying UCI and is the same as a priority of a PUSCH carrying UCI;

when a PUSCH carrying uplink control information UCI and a PUSCH not carrying UCI coexist, a priority of the PUSCH carrying UCI is higher than a priority of the PUSCH not carrying UCI; and when a PRACH, a PUCCH, a PUSCH, and an SRS coexist, the SRS has a lowest priority.

In this embodiment of the present invention, the priority sequence of the UCI carried in the transmission objects may include at least one of the following:

when channel state information and a scheduling request exist, a priority of the channel state information is lower than a priority of the scheduling request; and when hybrid automatic repeat request information and a scheduling request exist, a priority of the hybrid automatic repeat request information is higher than or equal to a priority of the scheduling request.

The priority sequence of the UCI of the transmission objects may include at least one of the following:

when channel state information exists and the channel state information includes a channel quality indicator and a precoding matrix, a priority of the channel quality indicator is equal to a priority of the precoding matrix; and when channel state information exists and the channel state information includes a rank indicator, a channel quality indicator, and a precoding matrix, the rank indicator has a highest priority.

In this embodiment of the present invention, the priority sequence of the carriers corresponding to the transmission objects may include at least one of the following:

a priority sequence determined based on index sequence numbers of the carriers, a carrier priority sequence configured by an upper layer, a priority sequence determined based on duplex modes of the carriers, a priority sequence determined based on RRC connection states of the carriers, and a priority sequence determined based on transmission points corresponding to the carriers.

In this embodiment of the present invention, the priority sequence of the carriers corresponding to the transmission objects may include a priority sequence determined based on duplex modes of the carriers, for example, a priority of a carrier whose duplex mode is FDD is lower than a priority of a carrier whose duplex mode is TDD.

Specifically, the priority sequence based on the information corresponding to the transmission objects may include at least one of the following:

a priority of a PUCCH transmitted on a carrier whose duplex mode is FDD is lower than a priority of a PUCCH transmitted on a carrier whose duplex mode is time division duplex TDD; in this case, the PUCCH transmitted on the FDD carrier and the PUCCH transmitted on the TDD carrier may be PUCCHs carrying hybrid automatic repeat request information; and a priority of a PUCCH transmitted on a carrier whose duplex mode is FDD is lower than a priority of a PUSCH that carries UCI and is transmitted on a carrier whose duplex mode is TDD; in this case, the UCI in the UCI-carrying PUSCH transmitted on the TDD carrier includes hybrid automatic repeat request information.

In this embodiment of the present invention, the priority sequence of the carriers corresponding to the transmission objects may include: a priority sequence determined based on RRC connection states of carriers, for example, a priority of a carrier supporting RRC connection is higher than a priority of a carrier not supporting RRC connection, or a priority of a carrier carrying RRC information is higher than a priority of a carrier not carrying RRC information. In this embodiment of the present invention, the user equipment may first determine a priority of a transmission object according to the priority sequence determined based on the RRC connection states. For example, if a carrier 1 is a carrier supporting RRC connection and a carrier 2 is a carrier not supporting RRC connection, a priority of the carrier 1 is higher than a priority of the carrier 2, regardless of types of transmission objects corresponding to the carrier 1 and the carrier 2, or regardless of UCI carried in transmission objects corresponding to the carrier 1 and the carrier 2. When there are still same-priority transmission objects after the priorities of the transmission objects are determined according to the priority sequence determined based on the RRC connection states, the priorities of the transmission objects may be further determined according to priorities of corresponding types of the transmission objects and/or priorities of the UCI carried in the transmission objects.

In this embodiment of the present invention, the performing a power reduction operation based on a priority sequence of information corresponding to the transmission objects in S220 includes:

determining a priority of each transmission object in the first transmission object set according to the priority sequence of the information corresponding to the transmission objects and corresponding information of each transmission object in the first transmission object set; and performing the power reduction operation according to the priority of each transmission object in the first transmission object set.

In this embodiment of the present invention, the determining a priority of each transmission object in the first transmission object set according to the priority sequence of the information corresponding to the transmission objects and corresponding information of each transmission object in the first transmission object set includes:

determining the priority of each transmission object in the first transmission object set according to the priority sequence of the types of the transmission objects and a type of each transmission object in the first transmission object set, where the priority sequence of the types of the transmission objects is included in the priority sequence of the information corresponding to the transmission objects; and when some of the transmission objects have a same priority after the priority of the each transmission object in the transmission object set is determined according to a priority sequence of a type of a transmission object and a type of the each transmission object in the transmission object set, determining a priority of each transmission object in same-priority transmission objects according to the priority sequence of the UCI carried in the transmission objects and UCI of each transmission object in the same-priority transmission objects, where the priority sequence of the UCI carried in the transmission objects is included in the priority sequence of the information corresponding to the transmission objects, or determining a priority of each transmission object in same-priority transmission objects according to the priority sequence of the carriers corresponding to the transmission objects and a carrier corresponding to each transmission object in the same-priority transmission objects, where the priority sequence of the carriers corresponding to the transmission objects is included in the priority sequence of the information corresponding to the transmission objects.

In this embodiment of the present invention, the performing the power reduction operation according to the priority of each transmission object in the first transmission object set includes:

performing the power reduction operation for the transmission objects in the first transmission object set one by one according to the priorities of the transmission objects, with a transmission object of a lowest priority being the first to undergo the power reduction, until a sum of acquired available transmit powers of all the transmission objects in the first transmission object set is less than or equal to the maximum transmit power.

In this embodiment of the present invention, when performing the power reduction for the transmission objects in the first transmission object set one by one according to the priorities of the transmission objects, with a transmission object of a lowest priority being the first to undergo the power reduction, it is satisfied that if an available transmit power of a transmission object with a priority of n is not 0, an available transmit power of a transmission object with a priority of n+1 is equal to an initial transmit power of the transmission object with the priority of n+1i, where m is the number of transmission objects in the first transmission object set, $m \geq n \geq 1$, and a transmission object with a priority of 1 has a lowest priority.

In this embodiment of the present invention, the performing the power reduction operation for the transmission objects in the first transmission object set one by one according to the priorities of the transmission objects, with a transmission object of a lowest priority being the first to undergo the power reduction, includes:

when multiple transmission objects have a same priority, performing equal power reduction for the multiple transmission objects that have the same priority.

It should be understood that, for details about how the base station determines the priority of the first transmission object set of the user equipment based on the priority sequence of the information corresponding to the transmission objects and performs a power reduction operation, refer to the power determining method 100, and for brevity, details are not repeatedly described herein.

In this embodiment of the present invention, after determining the second transmission object set that needs to be scheduled, the base station may determine, according to the priority of each transmission object in the second transmission object set, a resource and a modulation and coding scheme for scheduling each transmission object in the second transmission object set. For example, a transmission object with a higher priority uses more resources and a higher modulation and coding scheme. Apparently, the resource and the modulation and coding scheme for scheduling each transmission object in the second transmission object set may also be determined in another manner. For example, an available transmit power of each transmission object in the second transmission object set may be determined, and then the resource and the modulation and coding scheme for scheduling each transmission object may be determined according to the available transmit power of each transmission object.

Therefore, according to the power determining method in this embodiment of the present invention, a first transmission object set is determined, where the first transmission object set includes all to-be-transmitted uplink channels and/or SRSs of a user equipment; when it is determined that a sum of transmit powers of all transmission objects in the first transmission object set is greater than a maximum transmit power of the user equipment, a power reduction operation is performed based on a priority sequence of information corresponding to the transmission objects, so as to acquire an available transmit power of each transmission object in the first transmission object set, where a sum of available transmit powers of all the transmission objects in the first transmission object set is less than or equal to the maximum transmit power of the user equipment; a second transmission object set that needs to be scheduled is determined according to the available transmit power of each transmission object in the first transmission object set, where the available transmit power of each transmission object in the second transmission object set is not 0; and then scheduling is performed for the user equipment according to the second transmission object set, which can solve the problem in which a sum of transmit powers of to-be-transmitted objects of the user equipment is greater than a maximum transmit power of the user equipment.

Figure 3:
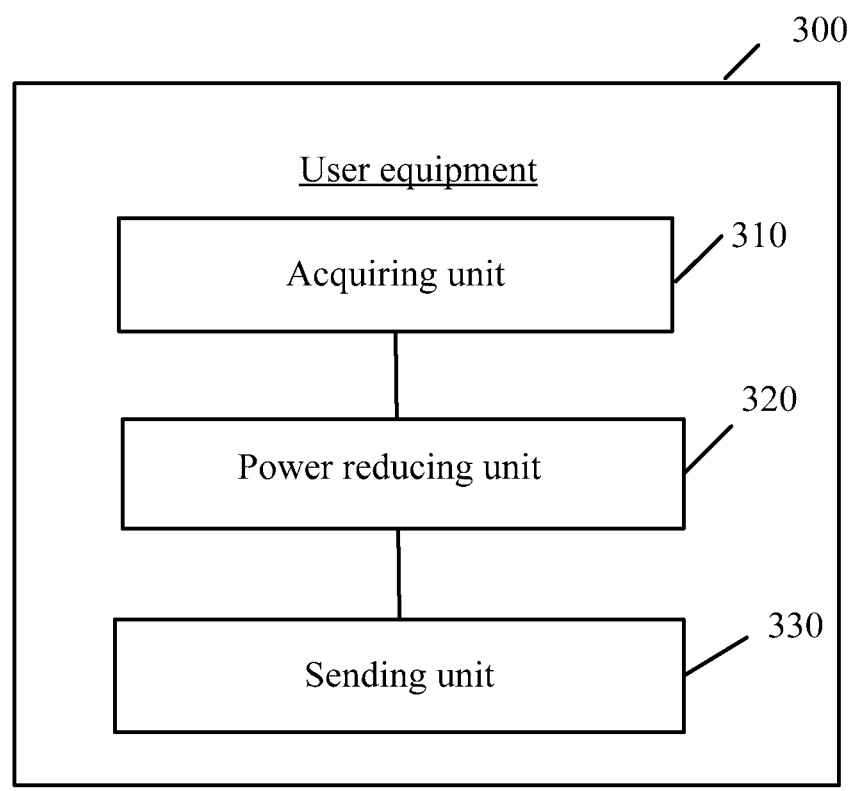
FIG. 3 is a schematic block diagram of a user equipment according to an embodiment of the present invention.

FIG. 3 is a schematic block diagram of a user equipment 300 according to an embodiment of the present invention. As shown in FIG. 3, the user equipment 300 includes:

an acquiring unit 310, configured to acquire an initial transmit power of each transmission object in a transmission object set, where the transmission object set includes all to-be-transmitted uplink channels and/or sounding reference signals SRSs, and configured to acquire a maximum transmit power and acquire a priority sequence of information corresponding to the transmission objects;

a power reducing unit 320, configured to: when a sum of initial transmit powers acquired by the acquiring unit 310 for all the transmission objects in the transmission object set is greater than the maximum transmit power, perform a power reduction operation based on the priority sequence of the information corresponding to the transmission objects, so as to acquire an available transmit power of each transmission object in the transmission object set, where a sum of available transmit powers of all the transmission objects in the transmission object set is not greater than the maximum transmit power; and a sending unit 330, configured to send each transmission object in the transmission object set according to the available transmit power that is acquired by the power reducing unit 320 and is corresponding to each transmission object in the transmission object set.

Optionally, the acquiring unit 310 is specifically configured to:

acquire the priority sequence of the information corresponding to the transmission objects, where the priority sequence of the information corresponding to the transmission objects includes at least one of the following: a priority sequence of types of the transmission objects, a priority sequence of UCI carried in the transmission objects, and a priority sequence of carriers corresponding to the transmission objects.

Optionally, the acquiring unit 310 is specifically configured to acquire the priority sequence of the types of the transmission objects, where the priority sequence of the types of the transmission objects includes at least one of the following:

when a physical random access channel PRACH exists, the PRACH has a highest priority;

when a physical uplink control channel PUCCH and a physical uplink shared channel PUSCH coexist, a priority of the PUCCH is higher than a priority of the PUSCH, or when a PUCCH and a PUSCH coexist, a priority of the PUCCH is higher than a priority of a PUSCH not carrying UCI but the priority of the PUCCH is the same as a priority of a PUSCH carrying UCI;

when a PUSCH carrying uplink control information UCI and a PUSCH not carrying UCI coexist, a priority of the PUSCH carrying UCI is higher than a priority of the PUSCH not carrying UCI; and when a PRACH, a PUCCH, a PUSCH, and an SRS coexist, the SRS has a lowest priority.

Optionally, the acquiring unit 310 is specifically configured to acquire the priority sequence of the UCI carried in the transmission objects, where the priority sequence of the UCI carried in the transmission objects includes at least one of the following:

when channel state information and a scheduling request exist, a priority of the channel state information is lower than a priority of the scheduling request; and when hybrid automatic repeat request information and a scheduling request exist, a priority of the hybrid automatic repeat request information is higher than or equal to a priority of the scheduling request.

Optionally, the acquiring unit 310 is specifically configured to acquire the priority sequence of the UCI carried in the transmission objects, where the priority sequence of the UCI carried in the transmission objects includes at least one of the following:

when channel state information exists and the channel state information includes a channel quality indicator and a precoding matrix, a priority of the channel quality indicator is equal to a priority of the precoding matrix; and when channel state information exists and the channel state information includes a rank indicator, a channel quality indicator, and a precoding matrix, the rank indicator has a highest priority.

Optionally, the acquiring unit 310 is specifically configured to acquire the priority sequence of the carriers corresponding to the transmission objects, where the priority sequence of the carriers corresponding to the transmission objects includes at least one of the following:

a priority sequence determined based on index sequence numbers of the carriers, a carrier priority sequence configured by an upper layer, a priority sequence determined based on duplex modes of the carriers, a priority sequence determined based on RRC connection states of the carriers, and a priority sequence determined based on transmission points corresponding to the carriers.

Optionally, the acquiring unit 310 is specifically configured to acquire the priority sequence determined based on the RRC connection states of the carriers, where the priority sequence determined based on the RRC connection states of the carriers includes at least one of the following:

a priority of a carrier supporting RRC connection is higher than a priority of a carrier not supporting RRC connection; and a priority of a carrier carrying RRC information is higher than a priority of a carrier not carrying RRC information.

Optionally, the acquiring unit 310 is specifically configured to acquire the priority sequence determined based on the duplex modes of the carriers, where the priority sequence determined based on the duplex modes of the carriers includes that: a priority of a carrier whose duplex mode is frequency division duplex FDD is less than a priority of a carrier whose duplex mode is time division TDD.

Optionally, the acquiring unit 310 is specifically configured to acquire the priority sequence of the information corresponding to the transmission objects, where the priority sequence of the information corresponding to the transmission objects includes at least one of the following:

a priority of a PUCCH transmitted on a carrier whose duplex mode is FDD is lower than a priority of a PUCCH transmitted on a carrier whose duplex mode is TDD, and both the PUCCH transmitted on the FDD carrier and the PUCCH transmitted on the TDD carrier carry hybrid automatic repeat request information; and a priority of a PUCCH transmitted on a carrier whose duplex mode is FDD is lower than a priority of a PUSCH that carries UCI and is transmitted on a carrier whose duplex mode is TDD, where the UCI in the UCI-carrying PUSCH transmitted on the TDD carrier includes hybrid automatic repeat request information.

Figure 4:
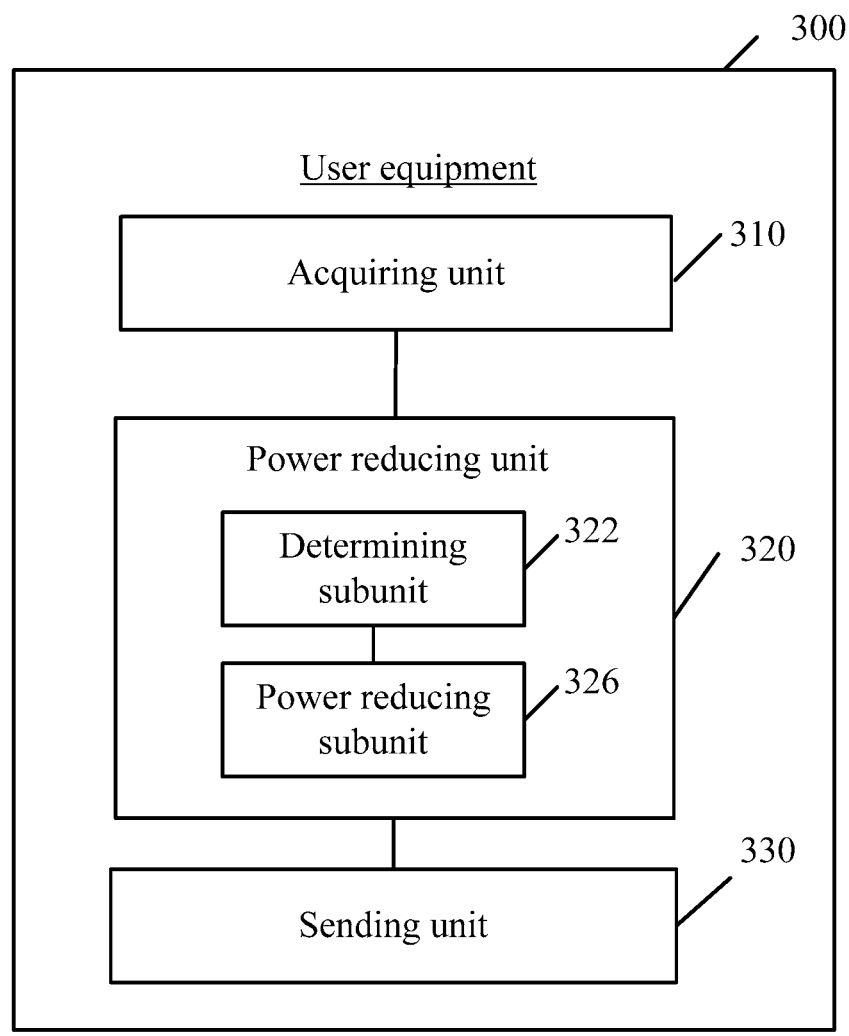
FIG. 4 is a schematic block diagram of a user equipment according to another embodiment of the present invention.

Optionally, as shown in FIG. 4, the power reducing unit 320 includes:

a determining subunit 322, configured to determine a priority of each transmission object in the transmission object set according to the priority sequence of the information corresponding to the transmission objects and corresponding information of each transmission object in the transmission object set; and a power reducing subunit 326, configured to perform the power reduction operation according to the priority determined by the determining subunit 322 for each transmission object in the transmission object set.

Optionally, the determining subunit 322 is specifically configured to:

determine the priority of each transmission object in the transmission object set according to the priority sequence of the types of the transmission objects and a type of each transmission object in the transmission object set, where the priority sequence of the types of the transmission objects is included in the priority sequence of the information corresponding to the transmission objects; and when some of the transmission objects have a same priority after the priority of the each transmission object in the transmission object set is determined according to a priority sequence of a type of a transmission object and a type of the each transmission object in the transmission object set, determine a priority of each transmission object in same-priority transmission objects according to the priority sequence of the UCI carried in the transmission objects and UCI of each transmission object in the same-priority transmission objects, where the priority sequence of the UCI carried in the transmission objects is included in the priority sequence of the information corresponding to the transmission objects, or determine a priority of each transmission object in same-priority transmission objects according to the priority sequence of the carriers corresponding to the transmission objects and a carrier corresponding to each transmission object in the same-priority transmission objects, where the priority sequence of the carriers corresponding to the transmission objects is included in the priority sequence of the information corresponding to the transmission objects.

Optionally, the power reducing subunit 326 is specifically configured to:

perform the power reduction operation for the transmission objects in the transmission object set one by one according to the priorities of the transmission objects, with a transmission object of a lowest priority being the first to undergo the power reduction, until a sum of acquired available transmit powers of all the transmission objects in the transmission object set is less than or equal to the maximum transmit power.

Optionally, the power reducing subunit 326 is specifically configured to:

perform the power reduction operation for the transmission objects in the transmission object set one by one according to the priorities of the transmission objects, with a transmission object of a lowest priority being the first to undergo the power reduction, until a sum of acquired available transmit powers of all the transmission objects in the transmission object set is less than or equal to the maximum transmit power, where when performing the power reduction for the transmission objects in the transmission object set one by one according to the priorities of the transmission objects, with a transmission object of a lowest priority being the first to undergo the power reduction, it is satisfied that if an available transmit power of a transmission object with a priority of n is not 0, an available transmit power of a transmission object with a priority of n+1 is equal to an initial transmit power of the transmission object with the priority of n+1, where m is the number of transmission objects in the transmission object set, $m \geq n \geq 1$, and a transmission object with a priority of 1 has a lowest priority.

Optionally, the power reducing subunit 326 is specifically configured to:

when multiple transmission objects have a same priority, perform equal power reduction for the multiple transmission objects that have the same priority.

Therefore, the user equipment in this embodiment of the present invention determines an initial transmit power of each transmission object in a transmission object set, where the transmission object set includes all to-be-transmitted uplink channels and/or SRSs; when a sum of initial transmit powers of all the transmission objects in the transmission object set is greater than a maximum transmit power, performs a power reduction operation based on a priority sequence of information corresponding to the transmission objects, so as to acquire an available transmit power of each transmission object in the transmission object set, where a sum of available transmit powers of all the transmission objects in the transmission object set is not greater than the maximum transmit power; and sends each transmission object in the transmission object set according to the available transmit power corresponding to each transmission object in the transmission object set, which can solve the problem in which a sum of transmit powers of to-be-transmitted objects of a user equipment is greater than a maximum transmit power of the user equipment.

Figure 5:
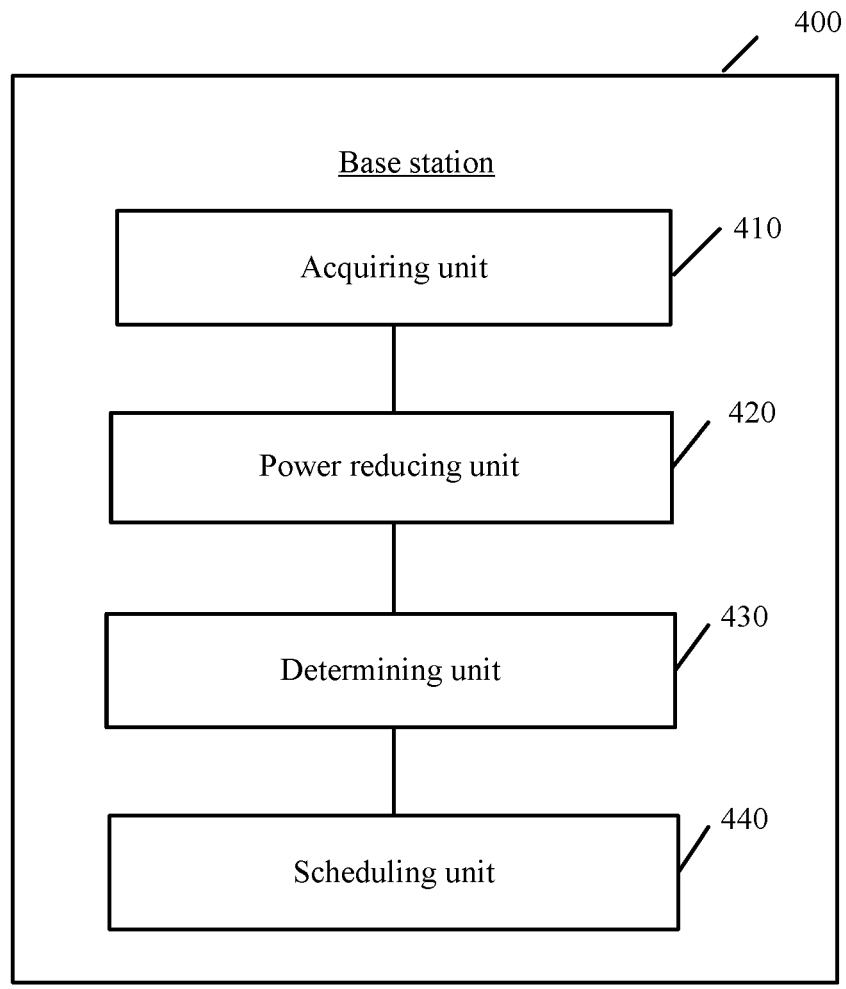
FIG. 5 is a schematic block diagram of a base station according to an embodiment of the present invention.
Figure 6:
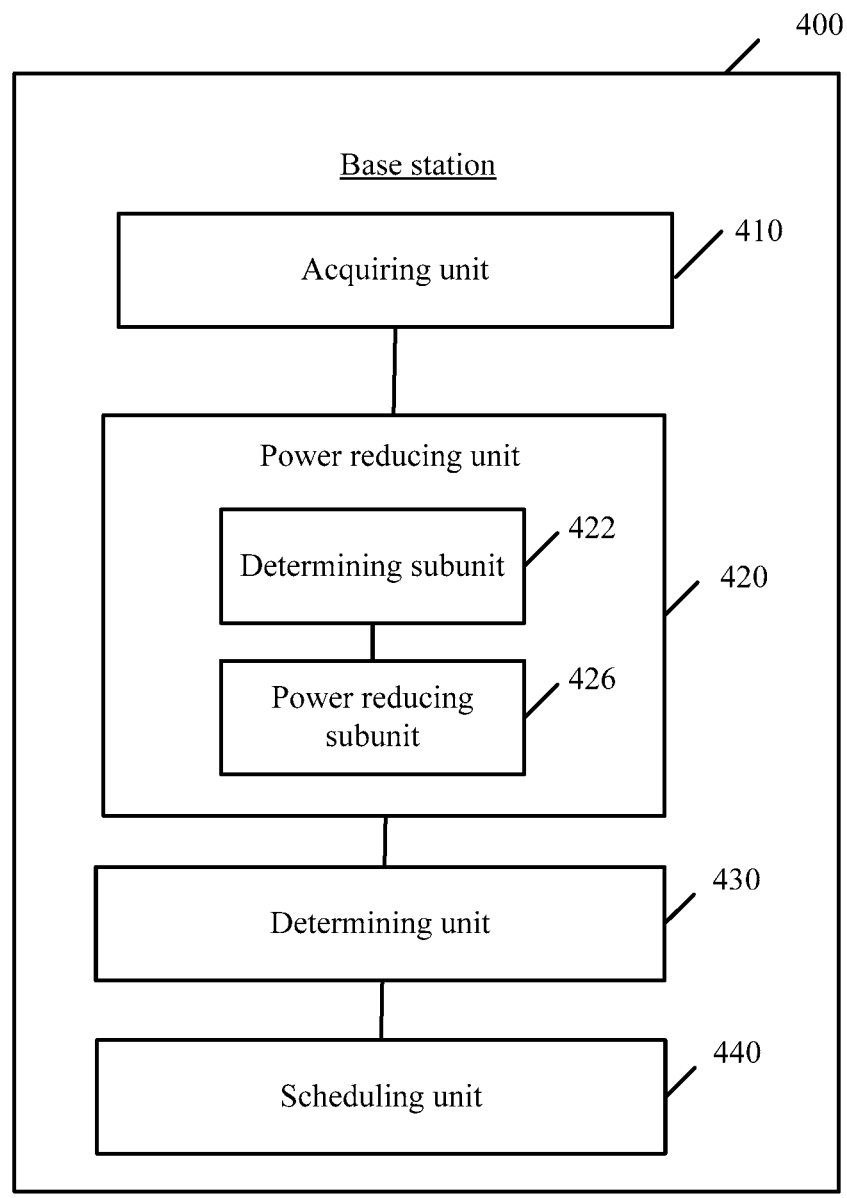
FIG. 6 is a schematic block diagram of a base station according to another embodiment of the present invention.

FIG. 5 is a schematic block diagram of a base station 400 according to an embodiment of the present invention. As shown in FIG. 5, the base station 400 includes:

an acquiring unit 410, configured to acquire a first transmission object set, where the first transmission object set includes all to-be-transmitted uplink channels and/or sounding reference signals SRSs of a user equipment, and configured to acquire a maximum transmit power of the user equipment and acquire a priority sequence of information corresponding to transmission objects;

a power reducing unit 420, configured to: when a sum of transmit powers acquired by the acquiring unit 410 for all the transmission objects in the first transmission object set is greater than the maximum transmit power of the user equipment, perform a power reduction operation based on the priority sequence acquired by the acquiring unit 410 for the information corresponding to the transmission objects, so as to acquire an available transmit power of each transmission object in the first transmission object set, where a sum of available transmit powers of all the transmission objects in the first transmission object set is less than or equal to the maximum transmit power of the user equipment;

a determining unit 430, configured to determine, from the first transmission object set and according to the available transmit power acquired by the power reducing unit 420 for each transmission object in the first transmission object set, a second transmission object set that needs to be scheduled, where an available transmit power of a transmission object in the second transmission object set is not 0; and a scheduling unit 440, configured to perform scheduling for the user equipment according to the second transmission object set determined by the determining unit 430.

Optionally, the acquiring unit 410 is specifically configured to:

acquire the priority sequence of the information corresponding to the transmission objects, where the priority sequence of the information corresponding to the transmission objects includes at least one of the following: a priority sequence of types of the transmission objects, a priority sequence of uplink control information UCI carried in the transmission objects, and a priority sequence of carriers corresponding to the transmission objects.

Optionally, the power reducing unit 420 includes:

a determining subunit 422, configured to determine a priority of each transmission object in the first transmission object set according to the priority sequence of the information corresponding to the transmission objects and corresponding information of each transmission object in the first transmission object set; and a power reducing subunit 426, configured to perform the power reduction operation according to the priority determined by the determining subunit 422 for each transmission object in the first transmission object set.

Optionally, the power reducing subunit 426 is specifically configured to:

perform the power reduction operation for the transmission objects in the first transmission object set one by one according to the priorities of the transmission objects, with a transmission object of a lowest priority being the first to undergo the power reduction, until a sum of acquired available transmit powers of all the transmission objects in the first transmission object set is less than or equal to the maximum transmit power.

Optionally, the power reducing subunit 426 is specifically configured to:

perform the power reduction operation for the transmission objects in the first transmission object set one by one according to the priorities of the transmission objects, with a transmission object of a lowest priority being the first to undergo the power reduction, until a sum of acquired available transmit powers of all the transmission objects in the first transmission object set is less than or equal to the maximum transmit power, where when performing the power reduction for the transmission objects in the first transmission object set one by one according to the priorities of the transmission objects, with a transmission object of a lowest priority being the first to undergo the power reduction, it is satisfied that if an available transmit power of a transmission object with a priority of n is not 0, an available transmit power of a transmission object with a priority of n+1 is equal to an initial transmit power of the transmission object with the priority of n+1, where m is the number of transmission objects in the first transmission object set, m≥n≥1, and a transmission object with a priority of 1 has a lowest priority.

Therefore, the base station in this embodiment of the present invention determines a first transmission object set, where the first transmission object set includes all to-be-transmitted uplink channels and/or SRSs of a user equipment; when it is determined that a sum of transmit powers of all transmission objects in the first transmission object set is greater than a maximum transmit power of the user equipment, performs a power reduction operation based on a priority sequence of information corresponding to the transmission objects, so as to acquire an available transmit power of each transmission object in the first transmission object set, where a sum of available transmit powers of all the transmission objects in the first transmission object set is less than or equal to the maximum transmit power of the user equipment; determines, according to the available transmit power of each transmission object in the first transmission object set, a second transmission object set that needs to be scheduled, where the available transmit power of each transmission object in the second transmission object set is not 0; and then performs scheduling for the user equipment according to the second transmission object set, which can solve the problem in which a sum of transmit powers of to-be-transmitted objects of a user equipment is greater than a maximum transmit power of the user equipment.

Figure 7:
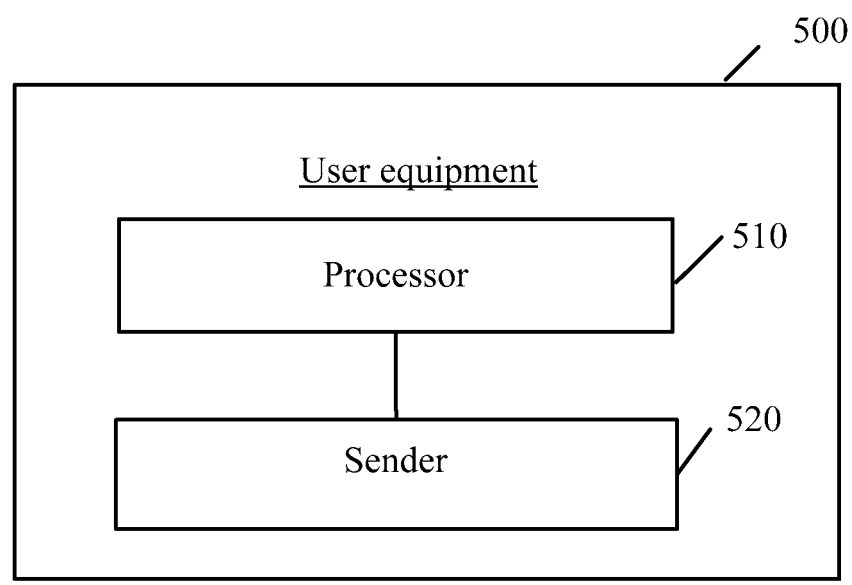
FIG. 7 is a schematic block diagram of a user equipment according to another embodiment of the present invention.

FIG. 7 is a schematic block diagram of a user equipment 500 according to an embodiment of the present invention. As shown in FIG. 7, the user equipment 500 includes:

a processor 510, configured to acquire an initial transmit power of each transmission object in a transmission object set, and acquire a priority sequence corresponding to the transmission objects and a maximum transmit power, where the transmission object set includes all to-be-transmitted uplink channels and/or sounding reference signals SRSs; when a sum of initial transmit powers of all the transmission objects in the transmission object set is greater than the maximum transmit power, perform a power reduction operation based on the priority sequence of the information corresponding to the transmission objects, so as to acquire an available transmit power of each transmission object in the transmission object set, where a sum of available transmit powers of all the transmission objects in the transmission object set is not greater than the maximum transmit power; and a sender 520, configured to send each transmission object in the transmission object set according to the available transmit power that is acquired by the processor 510 and is corresponding to each transmission object in the transmission object set.

Optionally, the processor 510 is specifically configured to:
acquire the priority sequence of the information corresponding to the transmission objects, where the priority sequence of the information corresponding to the transmission objects includes at least one of the following: a priority sequence of types of the transmission objects, a priority sequence of UCI carried in the transmission objects, and a priority sequence of carriers corresponding to the transmission objects.

Optionally, the processor 510 is specifically configured to acquire the priority sequence of the types of the transmission objects, where the priority sequence of the types of the transmission objects includes at least one of the following:
when a physical random access channel PRACH exists, the PRACH has a highest priority;
when a physical uplink control channel PUCCH and a physical uplink shared channel PUSCH coexist, a priority of the PUCCH is higher than a priority of the PUSCH, or a priority of the PUCCH is higher than a priority of a PUSCH not carrying UCI and is the same as a priority of a PUSCH carrying UCI;
when a PUSCH carrying uplink control information UCI and a PUSCH not carrying UCI coexist, a priority of the PUSCH carrying UCI is higher than a priority of the PUSCH not carrying UCI; and
when a PRACH, a PUCCH, a PUSCH, and an SRS coexist, the SRS has a lowest priority.

Optionally, the processor 510 is specifically configured to:
acquire the priority sequence of the UCI carried in the transmission objects, where the priority sequence of the UCI carried in the transmission objects includes at least one of the following:
when channel state information and a scheduling request exist, a priority of the channel state information is lower than a priority of the scheduling request; and
when hybrid automatic repeat request information and a scheduling request exist, a priority of the hybrid automatic repeat request information is higher than or equal to a priority of the scheduling request.

Optionally, the processor 510 is specifically configured to:
acquire the priority sequence of the carriers corresponding to the transmission objects, where the priority sequence of the carriers corresponding to the transmission objects includes at least one of the following: a priority sequence determined based on index sequence numbers of the carriers, a carrier priority sequence configured by an upper layer, a priority sequence determined based on duplex modes of the carriers, a priority sequence determined based on RRC connection states of the carriers, and a priority sequence determined based on transmission points corresponding to the carriers.

Optionally, the processor 510 is specifically configured to acquire the priority sequence determined based on the RRC connection states of the carriers, where the priority sequence determined based on the RRC connection states of the carriers includes at least one of the following:
a priority of a carrier supporting RRC connection is higher than a priority of a carrier not supporting RRC connection; and
a priority of a carrier carrying RRC information is higher than a priority of a carrier not carrying RRC information.

Optionally, the processor 510 is specifically configured to acquire the priority sequence determined based on the duplex modes of the carriers, where the priority sequence determined based on the duplex modes of the carriers includes that:
a priority of a carrier whose duplex mode is frequency division duplex FDD is lower than a priority of a carrier whose duplex mode is time division TDD.

Optionally, the processor 510 is specifically configured to acquire the priority sequence of the information corresponding to the transmission objects, where the priority sequence of the information corresponding to the transmission objects includes at least one of the following:
a priority of a PUCCH transmitted on a carrier whose duplex mode is FDD is lower than a priority of a PUCCH transmitted on a carrier whose duplex mode is TDD, and both the PUCCH transmitted on the FDD carrier and the PUCCH transmitted on the TDD carrier carry hybrid automatic repeat request information; and a priority of a PUCCH transmitted on a carrier whose duplex mode is FDD is lower than a priority of a PUSCH that carries UCI and is transmitted on a carrier whose duplex mode is TDD, where the UCI in the UCI-carrying PUSCH transmitted on the TDD carrier includes hybrid automatic repeat request information.

Optionally, the processor 510 is specifically configured to:

determine a priority of each transmission object in the transmission object set according to the priority sequence of the information corresponding to the transmission objects and corresponding information of each transmission object in the transmission object set, and perform the power reduction operation according to the priority of each transmission object in the transmission object set.

Optionally, the processor 510 is specifically configured to:

determine the priority of each transmission object in the transmission object set according to the priority sequence of the types of the transmission objects and a type of each transmission object in the transmission object set, where the priority sequence of the types of the transmission objects is included in the priority sequence of the information corresponding to the transmission objects; and when some of the transmission objects have a same priority after the priority of the each transmission object in the transmission object set is determined according to a priority sequence of a type of a transmission object and a type of the each transmission object in the transmission object set, determine a priority of each transmission object in same-priority transmission objects according to the priority sequence of the UCI carried in the transmission objects and UCI of each transmission object in the same-priority transmission objects, where the priority sequence of the UCI carried in the transmission objects is included in the priority sequence of the information corresponding to the transmission objects, or determining a priority of each transmission object in same-priority transmission objects according to the priority sequence of the carriers corresponding to the transmission objects and a carrier corresponding to each transmission object in the same-priority transmission objects, where the priority sequence of the carriers corresponding to the transmission objects is included in the priority sequence of the information corresponding to the transmission objects.

Optionally, the processor 510 is specifically configured to:

perform the power reduction operation for the transmission objects in the transmission object set one by one according to the priorities of the transmission objects, with a transmission object of a lowest priority being the first to undergo the power reduction, until a sum of acquired available transmit powers of all the transmission objects in the transmission object set is less than or equal to the maximum transmit power.

Optionally, the processor 510 is specifically configured to:

perform the power reduction operation for the transmission objects in the transmission object set one by one according to the priorities of the transmission objects, with a transmission object of a lowest priority being the first to undergo the power reduction, until a sum of acquired available transmit powers of all the transmission objects in the transmission object set is less than or equal to the maximum transmit power, where when performing the power reduction for the transmission objects in the transmission object set one by one according to the priorities of the transmission objects, with a transmission object of a lowest priority being the first to undergo the power reduction, it is satisfied that if an available transmit power of a transmission object with a priority of n is not 0, an available transmit power of a transmission object with a priority of n+1 is equal to an initial transmit power of the transmission object with the priority of n+1, where m is the number of transmission objects in the transmission object set, m≥n≥1, and a transmission object with a priority of 1 has a lowest priority.

Optionally, the processor 510 is specifically configured to:

when multiple transmission objects have a same priority, perform equal power reduction for the multiple transmission objects that have the same priority.

Therefore, the user equipment in this embodiment of the present invention determines an initial transmit power of each transmission object in a transmission object set, where the transmission object set includes all to-be-transmitted uplink channels and/or SRSs; when a sum of initial transmit powers of all the transmission objects in the transmission object set is greater than a maximum transmit power, performs a power reduction operation based on a priority sequence of information corresponding to the transmission objects, so as to acquire an available transmit power of each transmission object in the transmission object set, where a sum of available transmit powers of all the transmission objects in the transmission object set is not greater than the maximum transmit power; and sends each transmission object in the transmission object set according to the available transmit power corresponding to each transmission object in the transmission object set, which can solve the problem in which a sum of transmit powers of to-be-transmitted objects of a user equipment is greater than a maximum transmit power of the user equipment.

Figure 8:
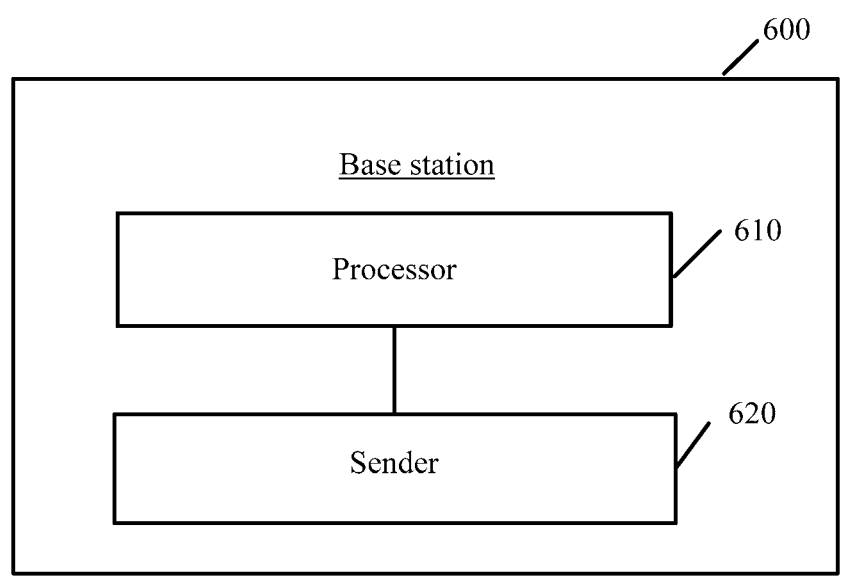
FIG. 8 is a schematic block diagram of a base station according to another embodiment of the present invention.

FIG. 8 is a schematic block diagram of a base station 600 according to an embodiment of the present invention. As shown in FIG. 8, the base station 600 includes:

a processor 610, configured to acquire a first transmission object set, where the first transmission object set includes all to-be-transmitted uplink channels and/or sounding reference signals SRSs of a user equipment, and to acquire a maximum transmit power of the user equipment and a priority sequence of information corresponding to transmission objects; configured to: when a sum of transmit powers of all the transmission objects in the first transmission object set is greater than the maximum transmit power of the user equipment, perform a power reduction operation based on the priority sequence of the information corresponding to the transmission objects, so as to acquire an available transmit power of each transmission object in the first transmission object set, where a sum of available transmit powers of all the transmission objects in the first transmission object set is less than or equal to the maximum transmit power of the user equipment; configured to determine, from the first transmission object set and according to the available transmit power of each transmission object in the first transmission object set, a second transmission object set that needs to be scheduled, where an available transmit power of a transmission object in the second transmission object set is not 0; and configured to determine scheduling information according to the second transmission object set; and a sender 620, configured to send the scheduling information to the user equipment, so that the user equipment receives or sends data according to the scheduling information.

Optionally, the processor 610 is specifically configured to:

acquire the priority sequence of the information corresponding to the transmission objects, where the priority sequence of the information corresponding to the transmission objects includes at least one of the following: a priority sequence of types of the transmission objects, a priority sequence of uplink control information UCI carried in the transmission objects, and a priority sequence of carriers corresponding to the transmission objects.

Optionally, the processor 610 is specifically configured to:

determine a priority of each transmission object in the first transmission object set according to the priority sequence of the information corresponding to the transmission objects and corresponding information of each transmission object in the first transmission object set; and perform the power reduction operation according to the priority of each transmission object in the first transmission object set.

Optionally, the processor 610 is specifically configured to: perform the power reduction operation for the transmission objects in the first transmission object set one by one according to the priorities of the transmission object, with a transmission object of a lowest priority being the first to undergo the power reduction, until a sum of acquired available transmit powers of all the transmission objects in the first transmission object set is less than or equal to the maximum transmit power.

Optionally, the processor 610 is specifically configured to:

perform the power reduction operation for the transmission objects in the first transmission object set one by one according to the priorities of the transmission object, with a transmission object of a lowest priority being the first to undergo the power reduction, until a sum of acquired available transmit powers of all the transmission objects in the first transmission object set is less than or equal to the maximum transmit power, where when performing the power reduction for the transmission objects in the first transmission object set one by one according to the priorities of the transmission object, with a transmission object of a lowest priority being the first to undergo the power reduction, it is satisfied that if an available transmit power of a transmission object with a priority of n is not 0, an available transmit power of a transmission object with a priority of n+1 is equal to an initial transmit power of the transmission object with the priority of n+1, where m is the number of transmission objects in the first transmission object set, $m \geq n \geq 1$, and a transmission object with a priority of 1 has a lowest priority.

Optionally, the processor 610 is specifically configured to:

when multiple transmission objects have a same priority, perform equal power reduction for the multiple transmission objects that have the same priority.

Therefore, the base station in this embodiment of the present invention determines a first transmission object set, where the first transmission object set includes all to-be-transmitted uplink channels and/or SRSs of a user equipment; when it is determined that a sum of transmit powers of all transmission objects in the first transmission object set is greater than a maximum transmit power of the user equipment, performs a power reduction operation based on a priority sequence of information corresponding to the transmission objects, so as to acquire an available transmit power of each transmission object in the first transmission object set, where a sum of available transmit powers of all the transmission objects in the first transmission object set is less than or equal to the maximum transmit power of the user equipment; determines, according to the available transmit power of each transmission object in the first transmission object set, a second transmission object set that needs to be scheduled, where the available transmit power of each transmission object in the second transmission object set is not 0; and then performs scheduling for the user equipment according to the second transmission object set, which can solve the problem in which a sum of transmit powers of to-be-transmitted objects of a user equipment is greater than a maximum transmit power of the user equipment.

It should be understood that in appropriate situations, features in the method embodiments of the present invention are applicable to the device embodiments of the present invention in proper cases, and vice versa.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes any medium that can store program code, such as a USB flash drive, a removable hard disk, a read-only memory (ROM), a random access memory (RAM,), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A power determining method comprising:
   determining an initial transmit power of each transmission object in a transmission object set, wherein the transmission object set comprises at least one of the following: (a) all to-be-transmitted uplink channels and (b) sounding reference signals (SRSs);
   when a sum of initial transmit powers of all transmission objects in the transmission object set is greater than a maximum transmit power, performing a power reduction operation based on a priority sequence of information corresponding to a transmission object, so as to acquire an available transmit power of each transmission object in the transmission object set, wherein a sum of available transmit powers of all the transmission objects in the transmission object set is not greater than the maximum transmit power;
   sending each transmission object in the transmission object set whose available transmit power is greater than zero according to the available transmit power to a base station;
   determining a priority of each transmission object in the transmission object set according to the priority sequence of the information corresponding to the transmission object and corresponding information of each transmission object in the transmission object set comprises at least one of the following groups (a) and (b):
   (a) determining a plurality of the transmission objects have a same priority according to a priority sequence of a type of a transmission object and a type of each transmission object in the transmission object set, wherein the priority sequence of the type of a transmission object comprises the priority sequence of the information corresponding to the transmission objects; and
   when a plurality of the transmission objects have a same priority after determining the priority of the each transmission object in the transmission object set according to a priority sequence of a type of a transmission object and a type of the each transmission object in the transmission object set, determining a priority of each transmission object in same-priority transmission objects according to a priority sequence of uplink control information (UCI) carried in a transmission object and the UCI of each transmission object in the same-priority transmission objects, wherein the priority sequence of the UCI carried in the transmission object is comprised of the priority sequence of the information corresponding to the transmission objects; and,
   (b) determining a priority of each transmission object in same-priority transmission objects with a priority sequence of a type of a transmission object or a priority sequence of uplink control information (UCI) carried in a transmission object according to a priority sequence of a carrier corresponding to a transmission object and a carrier corresponding to each transmission object in the same-priority transmission objects, wherein the priority sequence of the carrier corresponding to the transmission object is comprised in the priority sequence of the information corresponding to the transmission objects.

2. The method according to claim 1, wherein the priority sequence of the information corresponding to the transmission object comprises at least one of the following:
   a priority sequence of a type of a transmission object, a priority sequence of UCI carried in a transmission object, and a priority sequence of a carrier corresponding to a transmission object.

3. The method according to claim 2, wherein the priority sequence of the type of the transmission object comprises at least one of the following:
   when a physical random access channel (PRACH) exists, the PRACH has a highest priority;
   when a physical uplink control channel (PUCCH) and a physical uplink shared channel (PUSCH) coexist, a priority of the PUCCH is higher than a priority of the PUSCH, or a priority of the PUCCH is higher than a priority of a PUSCH not carrying UCI and is the same as a priority of a PUSCH carrying UCI;
   when a PUSCH carrying UCI and a PUSCH not carrying UCI coexist, a priority of the PUSCH carrying UCI is higher than a priority of the PUSCH not carrying UCI; and
   when a PRACH, a PUCCH, a PUSCH, and an SRS coexist, the SRS has a lowest priority.

4. The method according to claim 2, wherein the priority sequence of the UCI carried in the transmission object comprises at least one of the following:
   when channel state information and a scheduling request exist, a priority of the channel state information is lower than a priority of the scheduling request; and
   when hybrid automatic repeat request information and a scheduling request exist, a priority of the hybrid automatic repeat request information is higher than or equal to a priority of the scheduling request.

5. The method according to claim 2, wherein the priority sequence of the UCI carried in the transmission object comprises:
   a priority of UCI that has a highest priority among multiple UCI carried in each transmission object.

6. The method according to claim 2, wherein the priority sequence of the carrier corresponding to the transmission object comprises at least one of the following:
   a priority sequence determined based on a index sequence number of the carrier, a carrier priority sequence configured by an upper layer, a priority sequence determined based on a duplex mode of the carrier, a priority sequence determined based on a radio resource control (RRC) connection state of a carrier, and a priority sequence determined based on a transmission point corresponding to a carrier.

7. The method according to claim 6, wherein the priority sequence determined based on the RRC connection state of the carrier comprises at least one of the following:
   a priority of a carrier supporting RRC connection is higher than a priority of a carrier not supporting RRC connection; and
   a priority of a carrier carrying RRC information is higher than a priority of a carrier not carrying RRC information.

8. The method according to claim 2, wherein the priority sequence of a carrier corresponding to a transmission object comprises:
a priority of a carrier corresponding to a macro base station is higher than a priority of a carrier corresponding to a pico base station.

9. The method according to claim 1, wherein the performing the power reduction operation based on the priority sequence of information corresponding to the transmission object comprises:
performing the power reduction operation according to the priority of each transmission object in the transmission object set.

10. The method according to claim 9, wherein performing the power reduction operation according to the priority of each transmission object in the transmission object set comprises:
performing the power reduction operation for the transmission objects in the transmission object set one by one according to the priorities of the transmission objects, with a transmission object of a lowest priority being the first to undergo the power reduction, until a sum of acquired available transmit powers of all the transmission objects in the transmission object set is less than or equal to the maximum transmit power.

11. The method according to claim 9, wherein performing the power reduction operation according to the priority of each transmission object in the transmission object set comprises:
when multiple transmission objects have a same priority, performing equal power reduction for the multiple transmission objects that have the same priority.

12. A user equipment comprising:
a processor, configured to acquire an initial transmit power of each transmission object in a transmission object set, and acquire a priority sequence of information corresponding to the transmission objects and a maximum transmit power, wherein the transmission object set comprises at least one of the following: (a) all to-be-transmitted uplink channels and (b) sounding reference signals (SRSs); when a sum of initial transmit powers of all the transmission objects in the transmission object set is greater than the maximum transmit power, perform a power reduction operation based on the priority sequence of the information corresponding to a transmission object, so as to acquire an available transmit power of each transmission object in the transmission object set, wherein a sum of available transmit powers of all the transmission objects in the transmission object set is not greater than the maximum transmit power; and
a sender, configured to send each transmission object in the transmission object set whose available transmit power is greater than zero according to the available transmit power that is acquired by the processor and is corresponding to each transmission object in the transmission object set to a base station;
the processor is configured to implement at least one of (a) and (b) as follows:
(a) determine a priority of each transmission object in the transmission object set according to the priority sequence of the information corresponding to the transmission object and corresponding information of each transmission object in the transmission object set, wherein the priority sequence of the type of the transmission object is comprised in the priority sequence of the information corresponding to the transmission object; and
when a plurality of the transmission objects have a same priority after the priority of the each transmission object in the transmission object set is determined according to a priority sequence of a type of a transmission object and a type of the each transmission object in the transmission object set, determining a priority of each transmission object in same-priority transmission objects according to a priority sequence of upload control information (UCI) carried in a transmission object and UCI of each transmission object in the same-priority transmission objects, wherein the priority sequence of the UCI carried in the transmission object is comprised of the priority sequence of the information corresponding to the transmission objects; and
(b) determining a priority of each transmission object in same-priority transmission objects with a priority sequence of a type of a transmission object or a priority sequence of uplink control information (UCI) carried in a transmission object according to a priority sequence of a carrier corresponding to a transmission object and a carrier corresponding to each transmission object in the same-priority transmission objects, wherein the priority sequence of the carrier corresponding to the transmission object is comprised in the priority sequence of the information corresponding to the transmission objects.

13. The user equipment according to claim 12, wherein the processor is configured to:
acquire the priority sequence of the information corresponding to the transmission object, wherein the priority sequence of the information corresponding to the transmission object comprises at least one of the following: a priority sequence of a type of a transmission object, a priority sequence of UCI carried in a transmission object, and a priority sequence of a carrier corresponding to a transmission object.

14. The user equipment according to claim 13, wherein the processor is configured to acquire the priority sequence of a type of a transmission object, wherein the priority sequence of the type of the transmission object comprises at least one of the following:
when a physical random access channel (PRACH) exists, the PRACH has a highest priority;
when a physical uplink control channel (PUCCH) and a physical uplink shared channel (PUSCH) coexist, a priority of the PUCCH is higher than a priority of the PUSCH, or a priority of the PUCCH is higher than a priority of a PUSCH not carrying UCI and is the same as a priority of a PUSCH carrying UCI;
when a PUSCH carrying UCI and a PUSCH not carrying UCI coexist, a priority of the PUSCH carrying UCI is higher than a priority of the PUSCH not carrying UCI; and
when a PRACH, a PUCCH, a PUSCH, and an SRS coexist, the SRS has a lowest priority.

15. The user equipment according to claim 13, wherein the processor is configured to acquire the priority sequence of the UCI carried in the transmission object, wherein the priority sequence of the UCI carried in the transmission object comprises at least one of the following:
when channel state information and a scheduling request exist, a priority of the channel state information is lower than a priority of the scheduling request; and when hybrid automatic repeat request information and a scheduling request exist, a priority of the hybrid automatic repeat request information is higher than or equal to a priority of the scheduling request.

16. The user equipment according to claim 13, wherein the processor is configured to acquire the priority sequence of a type of a transmission object, wherein the priority sequence of the type of the transmission object comprises a priority of UCI that has a highest priority among multiple UCI carried in each transmission object.

17. The user equipment according to claim 13, wherein the processor is configured to acquire the priority sequence of the carrier corresponding to the transmission object, wherein the priority sequence of the carrier corresponding to the transmission object comprises at least one of the following: a priority sequence determined based on a index sequence number of a carriers, a carrier priority sequence configured by an upper layer, a priority sequence determined based on a duplex mode of a carrier, a priority sequence determined based on a radio resource connection (RRC) connection state of a carriers, and a priority sequence determined based on a transmission point corresponding to a carrier.

18. The user equipment according to claim 16, wherein the processor is configured to acquire the priority sequence determined based on the RRC connection state of the carrier, wherein the priority sequence determined based on the RRC connection state of the carrier comprises at least one of the following:
a priority of a carrier supporting RRC connection is higher than a priority of a carrier not supporting RRC connection; and a priority of a carrier carrying RRC information is higher than a priority of a carrier not carrying RRC information.

19. The user equipment according to claim 13, wherein the processor is configured to acquire the priority sequence of the carrier corresponding to the transmission object, wherein the priority sequence of the carrier corresponding to the transmission object comprises a priority of a carrier corresponding to a macro base station is higher than a priority of a carrier corresponding to a pico base station.

20. The user equipment according to claim 12, wherein the processor is configured to perform the power reduction operation according to the priority of each transmission object in the transmission object set.

21. The user equipment according to claim 20, wherein the processor is configured to:
perform the power reduction operation for the transmission objects in the transmission object set one by one according to the priorities of the transmission objects, with a transmission object of a lowest priority being the first to undergo the power reduction, until a sum of acquired available transmit powers of all the transmission objects in the transmission object set is less than or equal to the maximum transmit power.

22. The user equipment according to claim 20, wherein the processor is specifically configured to when multiple transmission objects have a same priority, perform equal power reduction for the multiple transmission objects that have the same priority.

* * * * *